United States Patent
Nishimoto et al.

(10) Patent No.: US 8,155,862 B2
(45) Date of Patent: Apr. 10, 2012

(54) INTERNAL COMBUSTION ENGINE CONTROL METHOD AND INTERNAL COMBUSTION ENGINE SYSTEM

(75) Inventors: Toshiaki Nishimoto, Hiroshima (JP); Naohiro Yamaguchi, Hiroshima (JP); Masahisa Yamakawa, Hiroshima (JP); Takashi Youso, Hiroshima (JP); Kouji Shishime, Hiroshima (JP); Hiroaki Abe, Hiroshima (JP); Hiroki Morimoto, Hiroshima (JP); Naoya Matsuo, Higashihiroshima (JP); Naoya Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 635 days.

(21) Appl. No.: 12/390,107

(22) Filed: Feb. 20, 2009

(65) Prior Publication Data

US 2009/0217906 A1 Sep. 3, 2009

(30) Foreign Application Priority Data

Feb. 28, 2008 (JP) ................ 2008-047332
Feb. 28, 2008 (JP) ................ 2008-047333

(51) Int. Cl.
*G06F 19/00* (2011.01)
*F02D 13/02* (2006.01)
*F02D 11/10* (2006.01)
*F01L 13/08* (2006.01)
*F01L 1/34* (2006.01)

(52) U.S. Cl. ........ 701/103; 701/110; 123/316; 123/348; 123/399; 123/403; 123/90.15

(58) Field of Classification Search ............... 123/90.11, 123/90.15–90.18, 316, 347, 348, 361, 399, 123/402, 403; 701/101–103, 110, 112, 113; 60/600, 601, 611
See application file for complete search history.

(56) References Cited

U.S. PATENT DOCUMENTS

| | | | | |
|---|---|---|---|---|
| 4,494,506 A * | 1/1985 | Hayama et al. | ............... | 123/348 |
| 5,033,268 A * | 7/1991 | Hitomi et al. | ............... | 60/605.1 |
| 6,397,814 B1 * | 6/2002 | Nagaishi et al. | ............... | 123/348 |
| 6,499,469 B2 * | 12/2002 | Ogawa et al. | ............... | 123/90.15 |
| 6,863,050 B2 * | 3/2005 | Iizuka et al. | ............... | 123/347 |
| 6,920,863 B1 * | 7/2005 | Aono et al. | ............... | 123/319 |
| 7,469,180 B2 * | 12/2008 | Yasui et al. | ............... | 701/105 |
| 7,568,454 B2 * | 8/2009 | Yasui et al. | ............... | 123/90.15 |
| 7,765,966 B2 * | 8/2010 | Leone | ............... | 123/90.17 |

FOREIGN PATENT DOCUMENTS

| | | | |
|---|---|---|---|
| JP | 2001159348 | | 6/2001 |
| JP | 2006097647 | | 4/2006 |
| JP | 2006274951 | | 10/2006 |
| JP | 2007040266 A | * | 2/2007 |

* cited by examiner

*Primary Examiner* — Willis Wolfe, Jr.
(74) *Attorney, Agent, or Firm* — Alleman Hall McCoy Russel & Tuttle LLP

(57) ABSTRACT

A system and method of controlling an internal combustion engine are provided. The method may include closing said intake valve at a timing in a first range, which is before a maximum charge closing timing with which an amount of air inducted into said cylinder from said air intake passage would be maximized at a given engine speed, during a cylinder cycle when a desired amount of air to be inducted into said cylinder is less than or equal to a predetermined air amount at the given engine speed. The method may further include closing said intake valve at a timing in a second range, which is after said maximum charge closing timing and separated from said first range during a cylinder cycle, when a desired amount of air to be inducted into said cylinder is greater than said predetermined air amount at the given engine speed.

20 Claims, 14 Drawing Sheets

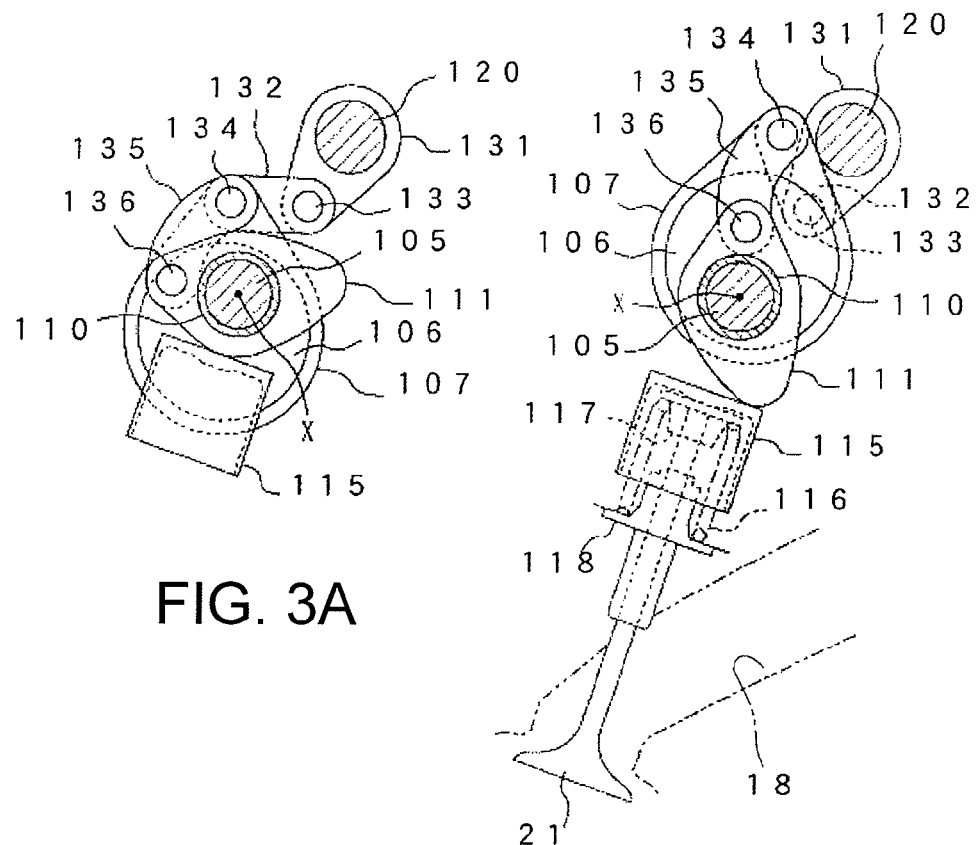
FIG. 3A
FIG. 3B
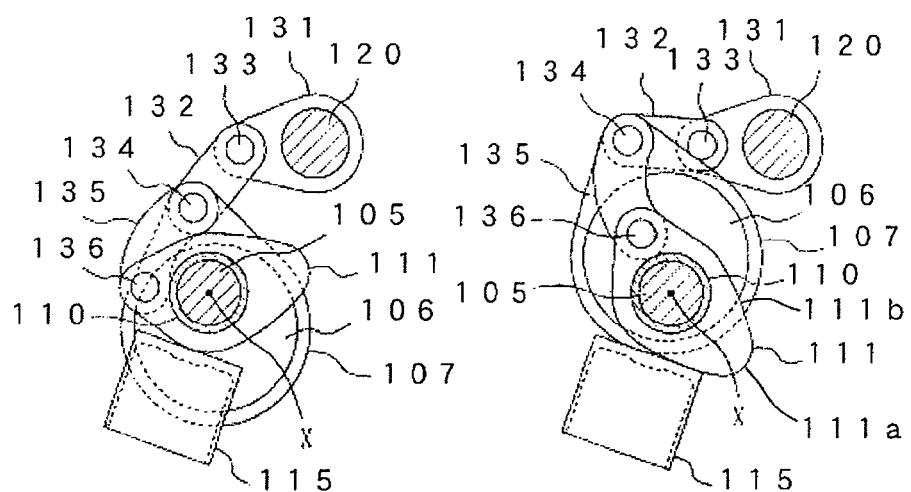
FIG. 3C
FIG. 3D

INTERNAL COMBUSTION ENGINE CONTROL METHOD AND INTERNAL COMBUSTION ENGINE SYSTEM

TECHNICAL FIELD

The present description relates to a method of controlling an internal combustion engine. More particularly, the present description pertains to a method for controlling a closing timing for an intake valve, and specifically to a method for selecting a closing timing of an intake valve applicable to an internal combustion engine with a relatively high compression ratio.

It is known that some engine systems control maximum valve lift of an intake valve of an internal combustion engine according to engine operating conditions.

One example of a method of controlling maximum valve lift of an intake valve of an internal combustion engine is described by Japanese Unexamined Patent Application Publication No. 2006-97647, hereinafter referred to as a first reference.

Generally, an intake air inertia increases as engine speed increases. Accordingly, if valve lift is equal to, or greater than, a predetermined value that is determined by air flow, when an intake valve is closed at a predetermined timing that is retarded in accordance with engine speed, an amount of air charge in an engine cylinder will become maximum. And, an amount of air charge in an engine cylinder decreases as a difference between an intake valve closing timing and the predetermined timing that is retarded in accordance with engine speed increases, in other words, as an intake valve is closed earlier or later than the predetermined timing.

A cam-driven type variable valve operation system described in the above reference is implemented according to this principle and controlled such that a valve lift increases as a desired amount of air charge in each of the engine cylinders increases, and an intake valve closing timing is retarded as a valve lift increases. Accordingly, an amount of air charge in an engine cylinder can be controlled to be a desired amount while maintaining a high intake passage pressure.

Actually, when a piston moves downward in an intake stroke, an in-cylinder pressure and in-crank case pressure act on upper and lower surfaces of a piston, respectively.

A level of in-cylinder pressure is substantially equal to a pressure in an intake passage and an in-crank case pressure is substantially equal to an atmosphere pressure.

Accordingly, if the pressure in the intake passage is smaller than the atmosphere pressure, pressure acting on the lower surface of a piston becomes greater than pressure acting on the upper surface of a piston, which causes a resistance force against a downward motion of the piston and a so-called pump loss is yielded. Therefore, by maintaining a pressure in the intake passage as high as possible, pump loss can be decreased and engine operating efficiency can be improved.

Meanwhile, increasing an expansion ratio is known as another method for improving engine operating efficiency. A geometric expansion ratio is defined as a ratio of a cylinder volume with which a piston is positioned at top dead center to a cylinder volume with which a piston is positioned at bottom dead center. Accordingly, as an expansion ratio is increased, energy of an air-fuel mixture is converted with higher efficiency by piston work, resulting in improving engine operating efficiency. However, this method increases a compression ratio too.

If a compression ratio of a spark-ignited internal combustion engine is increased, a possibility of abnormal combustion, such as auto-ignition of air-fuel mixture or knocking, is increased. In order to deal with this issue, in the case of detection of an operating condition where an auto-ignition may easily occur, a method comprising retarding or advancing a closing timing for an electromagnetic actuated intake valve that results in decreasing an effective compression ratio and, in turn, the desired amount of air to be inducted into an engine cylinder, has been described. One example of this method is described by Japanese Unexamined Patent Application Publication No. 2001-159348, hereinafter referred as a second reference.

With the method described in the second reference, an engine operating efficiency can be improved by increasing an expansion ratio while solving issues due to the higher compression ratio.

However, when a variable valve operating system, which is configured to cyclically open and close said intake valve by mechanically converting a rotational motion of a crankshaft of an internal combustion engine into a reciprocating motion of the intake valve (such as a variable valve operating system described in the first reference) is used, it is not always easy to balance an improvement of output using a higher compression ratio with regulation of abnormal combustion such as pre-ignition, knocking, etc.

That is, the variable valve operation system described in the first reference is configured to close an intake valve later as a desired amount of air to be inducted into an engine cylinder is greater while maintaining an amount of change for an intake valve opening timing relatively small. An intake valve is closed at a timing, which is before a maximum charge closing timing with which an amount of air inducted into an engine cylinder is maximized at a given engine speed during a cylinder cycle. And, by retarding an intake valve closing timing, an amount of air to be inducted into the cylinder is increased. When engine is operating within an operating range where an engine speed and a desired output is high and the possibility of occurrence of an abnormal combustion such as auto-ignition of air-fuel mixture is relatively high, simply limiting an intake valve closing timing toward an advanced side by a predetermined level may cause the following issues.

That is, when an engine output is high, engine speed is likely to increase. And, an intake valve closing timing, with which an amount of air inducted into a cylinder is maximized at a given engine speed during a cylinder cycle, is retarded as an engine speed is greater. Further still, the need to limit desired intake valve closing timing toward an advanced side is decreased as an engine speed increases because higher engine speed can enhance fluidity of air-fuel mixture in a cylinder and the possibility of abnormal combustion is decreased. Accordingly, desired intake valve closing timing is retarded at a faster rate as an engine speed is greater. However, a variable valve operation system where an intake valve closing timing is mechanically retarded relative to a phase of a crank shaft, such as in the first reference, has a limitation in its response. This limitation may cause the intake valve to close earlier than the desired intake valve closing timing, which may result in decreasing the amount of air charge in a cylinder. Thereby, there is insufficient air-fuel mixture in a cylinder due to lack of air charge, and desired output cannot be obtained when the air-fuel mixture is combusted.

Accordingly there is room for improvement to develop a method for controlling intake valve closing timing so as to enable an increase of an expansion ratio of an internal combustion engine, by operating intake valve closing timing more suitably for a broader engine operating range.

One aspect of the present description includes a method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising: closing said intake valve at a timing in a first range which is before a maximum charge closing timing with which an amount of air inducted into said cylinder from said air intake passage would be maximized at a given engine speed during a cylinder cycle when a desired amount of air to be inducted into said cylinder is less than or equal to a predetermined air amount at the given engine speed; and closing said intake valve at a timing in a second range which is after said maximum charge closing timing and separated from said first range during a cylinder cycle when a desired amount of air to be inducted into said cylinder is greater than said predetermined air amount at the given engine speed.

This method overcomes at least some of the disadvantages of the above references.

According to this method, when a desired amount of air to be inducted into said cylinder is less than or equal to a first predetermined air amount, an intake valve is closed at a timing in a first range, for example before a bottom dead center of intake stroke. Hereinafter this operation is referred to as "earlier closing operation". On the other hand, when a desired amount of air to be inducted into said cylinder is greater than a second predetermined air amount, an intake valve is closed at a timing in a second range that is later than the first range and separated from the first range, for example after the bottom dead center of intake stroke. Hereinafter this operation is referred to as "later closing operation."

Accordingly, as one example, a variable valve operation system configured to close an intake valve later as a desired amount of air to be inducted in a cylinder increases while substantially maintaining an intake valve opening timing is adopted. As one example with this system, if an engine is operated in an operation range where the desired amount of air to be inducted into a cylinder is relatively small, an engine is operated with a small valve lift suitable for the desired amount of air to be inducted into a cylinder by closing the intake valve earlier, thereby suppressing a mechanical loss caused by the valve operation. On the other hand, if the engine is operated in an operation range where the desired amount of air to be inducted into a cylinder is relatively large, the engine is operated with a large valve lift suitable for the desired amount of air to be inducted into the cylinder by closing the intake valve later, thereby suppressing possibility of abnormal combustion (such as pre-ignition) while inducting the desired amount of air into the cylinder.

And, in engine high-load condition with a higher desired amount of air to be inducted into the cylinder, the possibility of engine speed increasing after a period of time is high because engine output is increased. An intake valve closing timing, leading to a given amount of air to be inducted into a cylinder, is retarded as an engine speed increases, due to intake air inertia. Accordingly, by setting the intake valve closing timing in the second range when engine speed is low, a frequency of the intake valve closing timing residing in an intermediate range located between the first range and the second range when engine speed is increasing under high-load condition is reduced.

In this case, when a pressure in the intake passage might be decreased in order to prevent abnormal combustion due to excessive charge in the intermediate range, in one embodiment, by setting an intake valve closing timing in the second range when engine speed is low, a frequency of decreasing the pressure in the intake passage is reduced thereby reducing a pump loss.

As described above, this method can improve an engine operating efficiency with an increased expansion ratio while avoiding issues associated with increasing the compression ratio of an engine.

In an example embodiment of the method, the first range is before the intake bottom dead center during the cylinder cycle and the second range is after the intake bottom dead center during the cylinder cycle.

According to this embodiment, the expansion ratio can be increased with a range capable of avoiding abnormal combustion (e.g., pre-ignition) thereby improving engine operating efficiency, especially in low-speed operating condition where pre-ignition may occur.

In a preferable embodiment, this method further comprises decreasing the pressure of air inducted into the cylinder as the desired amount of air to be inducted into the cylinder increases, when the desired air amount is less than or equal to the predetermined air amount at the given engine speed.

According to this embodiment, the pressure of air inducted into said cylinder will be decreased before the desired amount of air to be inducted into said cylinder becomes greater than the predetermined air amount. Therefore, even when the intake valve is closed within the intermediate range (positioned between the first range and the second range) such that it is in the process of changing from the earlier closing operation to the later closing operation, the pressure of air inducted into said cylinder has already been decreased at that timing, which can avoid abnormal combustion, such as pre-ignition.

In one example embodiment, this method further comprises closing the intake valve later during the cylinder cycle as the engine speed increases.

This method can maintain air flow at an appropriate level in response to an intake air inertia that is increased as the engine speed is increased, and maintain a preferable amount of air charge over a broader operating range.

In one example embodiment, this method further comprises closing the intake valve earlier during the cylinder cycle as the desired amount of air to be inducted into the cylinder increases, when the desired air amount is greater than the predetermined air amount at the given engine speed.

This method can achieve the desired amount of air charge over a broader operating range without pump loss because when the desired amount of air to be inducted into a cylinder is maximum, the intake valve will close at a timing with which an amount of air inducted into a cylinder from an air intake passage is maximized.

As one non-limiting example, the pressure of air inducted into said cylinder can be substantially maintained when the desired air amount is greater than the predetermined air amount at the given engine speed.

Further, in another embodiment, this method may further comprise increasing the lift of the intake valve as the desired amount of air to be inducted into the cylinder increases, when the desired air amount is less than or equal to the predetermined air amount.

Yet, in another embodiment, this method may further comprise changing the timing of closing of the intake valve between the first range and the second range and temporarily decreasing a pressure of air inducted into the cylinder when the desired amount of air to be inducted into the cylinder changes beyond the predetermined air amount at the given engine speed.

A second aspect of the present description includes a method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising: closing said intake valve later as a desired amount of air to be inducted into said cylinder increases, and before a maximum charge closing timing with which an amount of air inducted into said cylinder from said air intake passage is maximized at a given engine speed during a cylinder cycle; and decreasing a pressure of air inducted into said cylinder as said timing of closing said intake valve is retarded before said maximum charge closing timing at the given engine speed during the cylinder cycle.

This method also overcomes at least some of the disadvantages of the references described above.

According to this method, the desired amount of air to be inducted into the cylinder is achieved with keeping pressure in the intake passage high until air charge reaches excessive air charge where the possibility of abnormal combustion is high. Therefore, engine operating efficiency is improved with decreased intake air pump loss when engine operation condition is a low-load condition, where the engine tends to stay for a relatively long period. Further when the engine operating condition shifts from the earlier closing operation range to the later closing operation range, the intake valve closing timing can be retarded closer to a timing with which an amount of air inducted into a cylinder would be maximized at the given engine speed during a cylinder cycle in advance. As a result, even when a transient change of the intake valve closing timing occurs, appropriate air charge is achieved while decreasing the possibility of abnormal combustion associated with higher compression ratios.

In one example embodiment, this method further comprises closing the intake valve at a timing which is later during the cylinder cycle, as a desired amount of air to be inducted into a cylinder increases, and which is before a maximum charge closing timing at the given engine speed during the cylinder cycle; and increasing a pressure of air inducted into the cylinder as a timing of closing the intake valve is retarded, after the maximum charge closing timing at the given engine speed during the cylinder cycle.

According to this method, when an intake valve closing timing is retarded to such an extent that a possibility of abnormal combustion sufficiently decreases, an intake pump loss in high air charge range can be decreased by increasing the pressure in the intake passage. Further, when the engine condition changes between the earlier closing operation range and the later closing operation range, the intake valve closing timing can come closer to the maximum charge closing timing with which the amount of air inducted into the cylinder is maximized at a given engine speed during a cylinder cycle. As a result, a frequency of the intake valve closing in an operation range where there is a concern about abnormal combustion can be minimized, which can increase the expansion ratio and improve engine operating efficiency while avoiding issues associated with higher compression ratios.

In one example embodiment, a throttle valve is provided in an air intake passage and is configured to adjust air flow inducted into a cylinder, and wherein a decreasing of the pressure of air inducted into a cylinder is made by closing the throttle valve.

In this embodiment, because control of throttle opening is used as a method of controlling the pressure in the intake passage, desired combustion characteristics can be achieved easily with an existing component. In this case, as one non-limiting example, a throttle valve may be opened after it was closed.

As another example, an exhaust gas recirculation passage is provided which introduces exhaust gas from an exhaust gas passage of an internal combustion engine to the air intake passage downstream of the throttle valve, and this method further comprises increasing flow of an exhaust gas recirculation passage as said throttle valve closes.

In this example, as the operating condition comes close to a range where abnormal combustion is of concern, pre-ignition is restricted by outer EGR gas recycling from an outer exhaust gas recirculation passage that has lower temperature than inner EGR gas which is a gas that remained in a cylinder. Therefore, engine operating efficiency is improved while avoiding abnormal combustion and decreasing pump loss over a broad operation range.

A third aspect of the present description includes a system comprising: an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage; an intake valve driving mechanism which is configured to cyclically open and close said intake valve by converting a rotational motion of a crankshaft of said internal combustion engine into a reciprocating motion of said intake valve; and a controller configured to control said intake valve driving mechanism to: close said intake valve at a timing in a first range, which is before a maximum charge closing timing with which an amount of air inducted into said cylinder from said air intake passage is maximized at a given engine speed, during a cylinder cycle when a desired amount of air to be inducted into said cylinder is less than or equal to a predetermined air amount; and close said intake valve at a timing in a second range which is after said maximum charge closing timing and separated from said first range during a cylinder cycle, when a desired amount of air to be inducted into said cylinder is greater than said predetermined air amount at the given engine speed.

This system also overcomes at least some of the disadvantages of the references described above in the same manner as the first aspect of the present description, described above.

In one non-limiting example, an internal combustion engine has a geometric compression ratio of 13:1 or greater.

In another non-limiting example, the intake valve driving mechanism includes a valve lift changing mechanism configured to change a valve lift during a cylinder cycle, and wherein a controller configured to control the valve lift mechanism to increase a lift of the intake valve as a desired amount of air to be inducted into a cylinder increases when the desired air amount is less than or equal to said predetermined air amount.

In one example embodiment, a throttle valve is provided in an air intake passage and is configured to adjust air flow inducted to a cylinder, and wherein a controller can be further configured to control an intake valve driving mechanism to change timings of closing an intake valve between a first range and a second range and control the throttle valve to temporarily close said air intake passage when a desired amount of air to be inducted into said cylinder changes beyond said predetermined air amount.

A fourth aspect of the present description includes a system comprising: an internal combustion engine having a cylinder accommodating a piston which reciprocates therein, and defining a combustion chamber, an air intake passage through which air is inducted into a cylinder, a throttle valve arranged in an air intake passage and configured to adjust air flow inducted to a cylinder, and an intake valve capable of shutting off air flowing into a cylinder from an air intake passage; an intake valve driving mechanism which is configured to cyclically open and close an intake valve by converting a rotational motion of a crankshaft of an internal combustion engine into a reciprocating motion of an intake valve; and a controller configured to control: an intake valve driving mechanism to close an intake valve later as a desired amount of air to be inducted into a cylinder increases, wherein the timing of closing is before a maximum charge closing timing with which an amount of air inducted into a cylinder from an air intake passage is maximized at a given engine speed during a cylinder cycle; and a throttle valve to close an air intake passage as a timing of closing an intake valve is retarded before a maximum charge closing timing at the given engine speed during the cylinder cycle.

This system also overcomes at least some of the disadvantages of the references described above in the same manner as the second aspect of the present description, described above.

In one example embodiment, the controller is further configured to control the throttle valve to open as the timing of closing an intake valve is retarded after the maximum charge closing timing at the given engine speed during the cylinder cycle.

According to the present description, if a variable valve operation system, configured to close the intake valve later as the desired amount of air to be inducted in the cylinder increases while maintaining an amount of change of intake valve opening timing relatively small, is adopted, as one example, when the engine is operated in the operation range where the desired amount of air to be inducted into the cylinder is relatively small, the engine may be operated with smaller valve lift by closing the intake valve earlier, thereby decreasing a mechanical loss due to excessive valve operation.

The above advantages and other advantages, and features of the present description, will be readily apparent from the following Detailed Description when taken alone or in connection with the accompanying drawings.

BRIEF DESCRIPTION OF THE DRAWINGS

FIGS. 3A to 3D are cross-sectional views showing a substantial part of the intake valve driving mechanism, where FIG. 3A shows the mechanism when a valve lift is 0 in a large-lift control state, FIG. 3B shows when the valve lift is the maximum in the large-lift control state, FIG. 3C shows when the valve lift is 0 in a small-lift control state, and FIG. 3D shows the valve lift is the maximum in the small-lift control state.

FIG. 11A shows the intake valve closing timing in an example where a throttle valve opening is changed when a target air charge amount varies at a given engine speed, and FIG. 11B shows the intake valve closing timing in an example where the throttle valve opening is maintained constant when a target air charge amount varies at a given engine speed.

FIG. 12A shows the throttle valve opening in the example of FIG. 11A, and FIG. 12B shows the throttle valve opening in the example of FIG. 11B.

FIG. 14A shows the intake valve closing timing in the example of FIGS. 11A and 12A, and FIG. 14B shows the intake valve closing timing in the example of FIGS. 11B and 12B.

DETAILED DESCRIPTION

Hereinafter, a preferred embodiment of the invention will be described with reference to the drawings.

Figure 1:
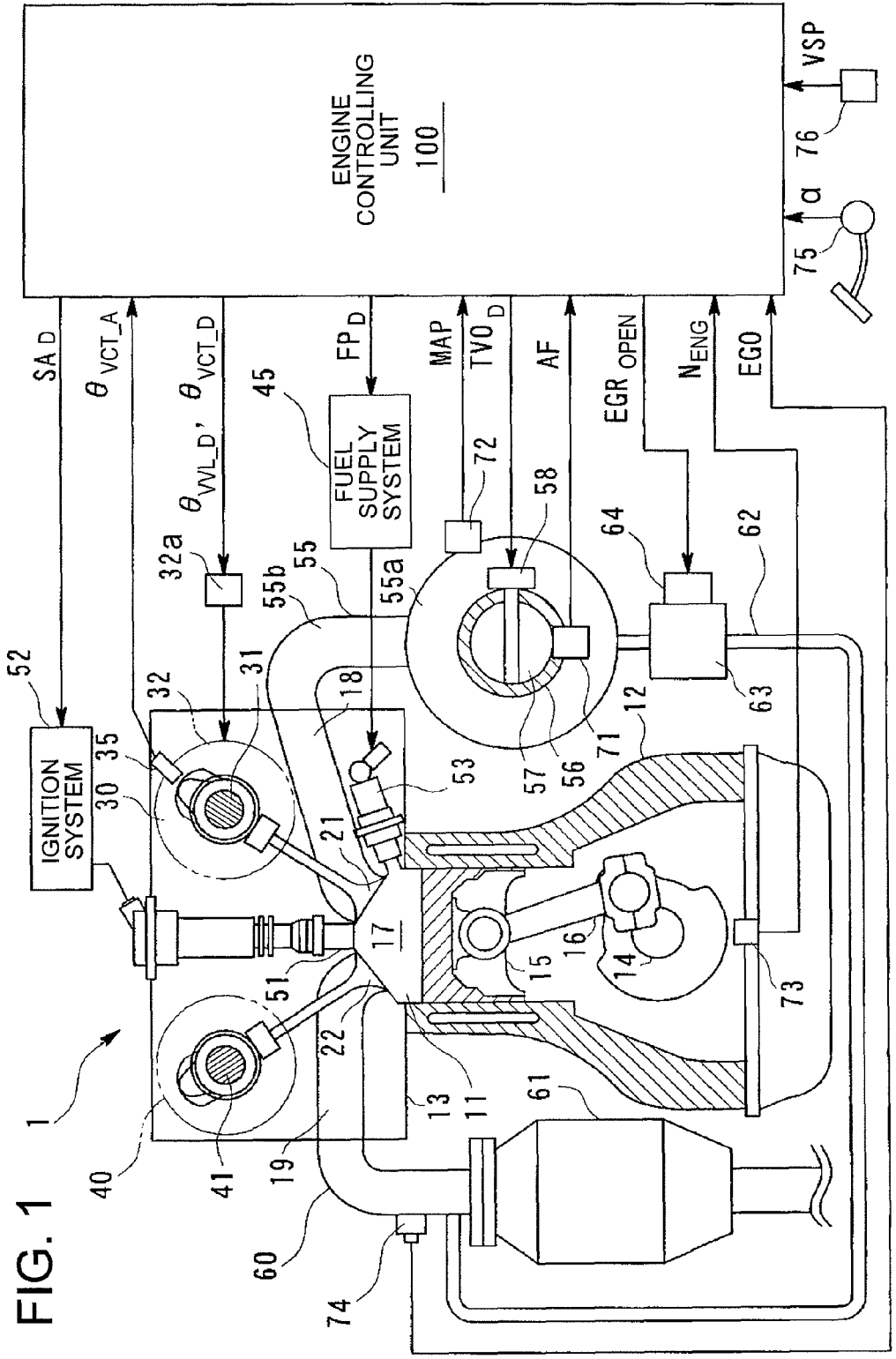
FIG. 1 is a schematic configuration diagram of an internal combustion engine system according to an embodiment of the present invention.

FIG. 1 is a schematic configuration drawing of an internal combustion engine system according to an embodiment of the invention.

With reference to FIG. 1, the internal combustion engine system includes an engine 1, various actuators, various sensors, and an engine controlling unit 100 as a controller controlling the actuator based on a signal from the sensor(s) which are associated with the engine 1.

The engine 1 is a spark-ignited internal combustion engine which has four cylinders, including a first to a fourth four cylinder 11; however, the number of cylinders may be any number. The engine 1 is installed in a vehicle such as an automobile, and a crankshaft 14 thereof is coupled to drive wheels via a transmission to drive a vehicle.

The engine 1 according to the embodiment has a geometric compression ratio of 13:1 or greater, and the geometric compression ratio is preferably 14:1 or greater and 16:1 or smaller. Such geometric compression ratios lead to increased compression ratios thereby, increasing the engine efficiency. Therefore, in the embodiment, the geometric compression ratio is set to 13:1 or greater to obtain high torque and sufficiently decrease fuel consumption while avoiding knocking by way of retarded ignition timing and the like.

However, the higher the compression ratio, the higher the possibility of abnormal combustion occurrence and thus it may be necessary to lessen the effective compression ratio, that is, reduce the cylinder air charge amount, during engine operation. In such examples, the output decreases for the volume of the cylinder, leading to a decrease in efficiency of the engine with respect to the ratio of engine output to weight. Also, installation of the engine 1 to a vehicle such as an automobile, may have issues due to size constraints of an engine room. Therefore, an upper limit of the geometric compression ratio is preferably set to 16:1 or smaller.

The engine main body 1 includes a cylinder block 12 and a cylinder head 13 placed thereon, inside which a cylinder 11 is formed. As is known, a crankshaft 14 is rotatably supported in the cylinder block 12 by a journal, a bearing and the like. This crankshaft 14 is coupled to piston (disposed within the cylinders) via a connecting rod 16.

A piston 15 is slidably inserted and fitted to each of the cylinder 11 to define a combustion chamber 17. The cylinder head 13 is formed with two intake ports 18 for every cylinder 11, only one of which is shown in FIG. 1, and which intake ports communicate with the combustion chamber 17. Similarly, the cylinder head 13 is formed with two exhaust ports 19 for every cylinder 11, which exhaust ports communicate with the combustion chamber 17. As shown in the figure, an intake valve 21 and an exhaust valve 22 are provided to block (close) the intake port 18 and the exhaust port 19 from the combustion chamber 17, respectively. The intake valve 21 is driven by an intake valve driving mechanism 30 as a valve operating device to reciprocate at a predetermined timing to open and close the intake port 18. The exhaust valve 22 is driven by an exhaust valve driving mechanism 40 to reciprocate at a predetermined timing to open and close the exhaust port 19.

The intake valve driving mechanism 30 has an intake camshaft 31, and the exhaust valve driving mechanism 40 has an exhaust camshaft 41. The camshafts 31 and 41 are coupled to the crankshaft 14 via a power transmission mechanism such as a known chain-sprocket mechanism. The power transmission mechanism is configured such that the camshafts 31 and 41 rotate one time while the crankshaft 14 rotates two times.

A phase angle of the camshaft is detected by a cam phase sensor 35, and a detected signal $\theta_{VCT\_A}$ thereof is inputted to the engine controlling unit 100.

A spark plug 51 is attached to the cylinder head 13 with a known configuration such as a thread. An ignition system 52 receives a control signal $SA_D$ from the engine controlling unit 100 to apply current to the spark plug 51 such that the spark plug 51 generates a spark at a desired ignition timing.

Fuel injectors 53 are attached to one side of the cylinder head 13 (an intake side in the illustrated example) with a known configuration using, for example, a bracket. The fuel injector 53 is arranged such that a tip thereof is positioned below the intake port 18 in a vertical direction and midway between the two intake ports 18 (as described above) in a horizontal direction to face the inside of the combustion chamber 17.

A fuel supply system 45 includes a high-pressure pump (not shown) for supplying the fuel injector 53 with pressure-raised fuel, a pipe and hose for feeding the fuel from the fuel tank to this high-pressure pump, and an electrical circuit for actuating the fuel injector 53. The electrical circuit receives the control signal $FP_D$ from the engine controlling unit 100 to actuate a solenoid of the fuel injector 53 to inject a target amount of fuel at a predetermined timing.

The intake port 18 communicates with a surge tank 55a by way of an intake pathway 55b in an intake manifold 55. Intake flow from an air cleaner, not shown, passes through a throttle body 56 to be supplied to the surge tank 55a. The throttle body 56 has a throttle valve 57 arranged therein, which narrows the intake flow flowing to the surge tank 55a and adjusts the flow volume thereof. A throttle valve actuator 58 receives the control signal $TVO_D$ from the engine controlling unit 100 to adjust the opening of the throttle valve 57.

The exhaust port 19 communicates with a passage in the exhaust pipe by way of an exhaust pathway in an exhaust manifold 60, as is known. An exhaust passage downstream of the exhaust manifold 60 has an exhaust gas treatment system arranged therein having one or more catalytic converters, for example catalytic converter 61. The catalytic converter 61 may be a known three-way catalyst, a lean NOx catalyst, an oxidation catalyst and the like. Other exhaust gas treatment systems or devices may be used alternatively or additionally to catalytic converter 61, so long as they satisfy the purpose of exhaust gas treatment by a specific fuel control method.

Further, the intake manifold 55 (downstream of the throttle valve 57) and the exhaust manifold 60 are coupled with each other via an exhaust gas recirculation (EGR) pipe 62 such that a part of the exhaust gas is recirculated to an intake system (hereinafter, also referred to as EGR). Since the pressure on the exhaust side is higher than that on the intake side, a part of the exhaust gas flows into the intake manifold 55 (referred to as EGR gas) to be mixed with new air inducted from intake manifold 55 to the combustion chamber 17. The EGR pipe 62 is provided with an EGR valve 63 so as to adjust the flow volume of the EGR gas. An EGR valve actuator 64 receives the control signal $EGR_{OPEN}$ from the engine controlling unit 100 to adjust the opening of the EGR valve 63.

The engine controlling unit 100 is a controller using a known microcomputer as a base and includes a central processing unit (CPU) for executing programs, a memory such as a RAM and a ROM for storing programs and data, and an input and output (I/O) bus for inputting and outputting electric signals.

The engine controlling unit 100 accepts various inputs such as the intake air flow AF from an air flow sensor 71, the intake manifold pressure MAP from an intake pressure sensor 72, and the crank angle pulse signal from a crank angle sensor 73. The engine controlling unit 100 calculates the engine speed $N_{ENG}$; for example, based on the crank angle pulse signal. Further, the engine controlling unit 100 also accepts the oxygen concentration EGO of the exhaust gas from an oxygen concentration sensor 74. Additionally, the engine controlling unit accepts a gas-pedal opening signal a from a gas-pedal opening sensor 75 for detecting the amount of depressing the gas pedal. The engine controlling unit 100 accepts the vehicle speed signal VSP from a vehicle speed sensor 76 for detecting the rotation speed of an output shaft of the transmission.

More specifically, the engine controlling unit 100 calculates such a control parameter of the engine 1 as follows based on the input described above. For example, the parameter includes a target throttle valve opening TVO, a fuel injection amount FP, an ignition timing SA, a valve phase angle $\theta_{VCT}$, and an EGR amount (EGR valve opening) $Q_{EGR}$. Then, based on the control parameters, corresponding control signals are outputted as a throttle valve opening signal $TVO_D$, a fuel injection pulse signal $FP_D$, an ignition pulse signal $SA_D$, a valve phase angle signal $\theta_{VCT\_D}$, a valve lift signal $\theta_{VVL\_D}$, and an EGR opening signal $EGR_{OPEN}$ to the throttle valve actuator 58, the fuel supply system 45, the ignition system 52, the intake valve driving mechanism 30, the EGR actuator 64 and the like.

Figure 2:
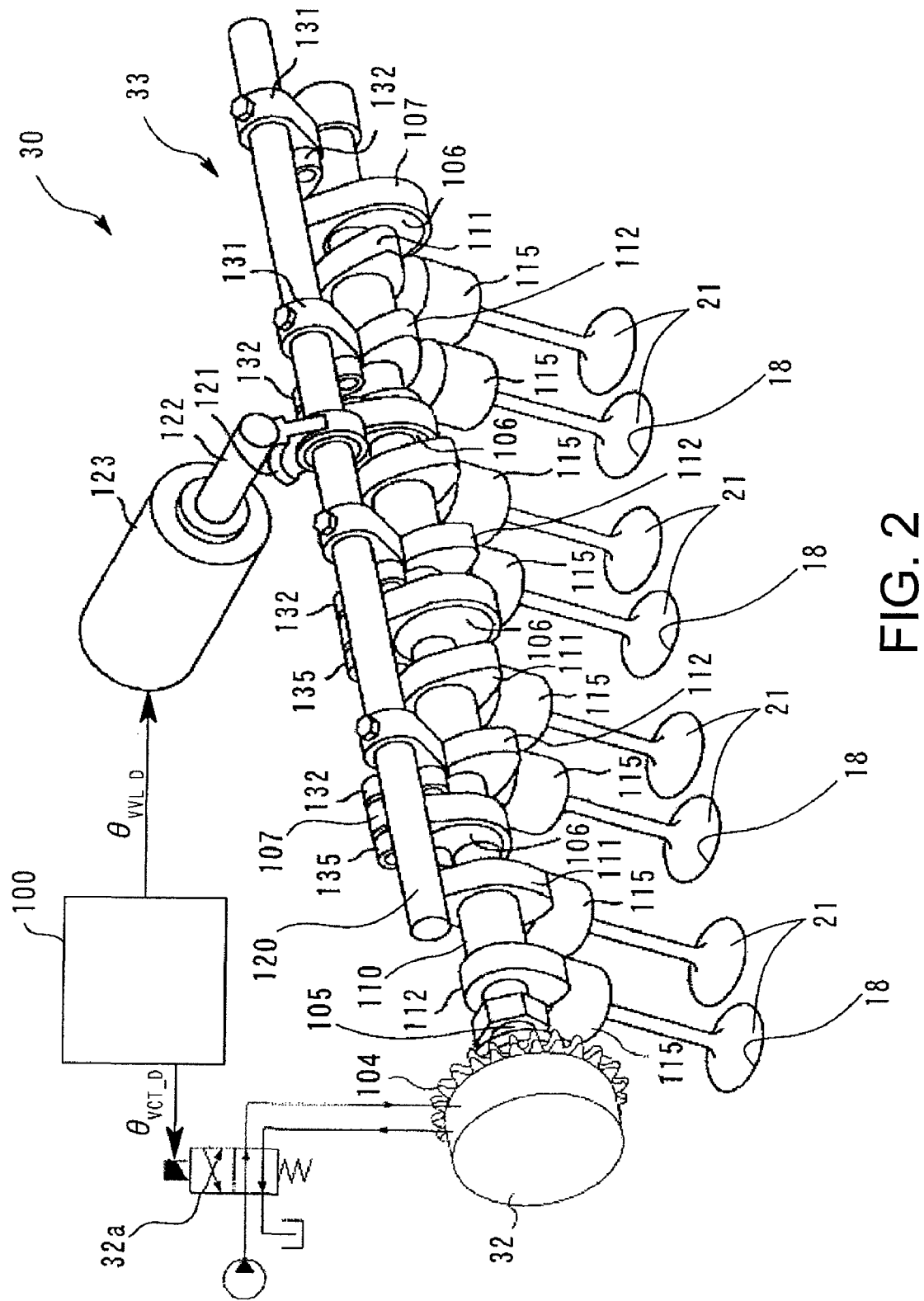
FIG. 2 is a perspective view showing a specific configuration of an intake valve driving mechanism according to the embodiment of FIG. 1.

Next, details of the intake valve driving mechanism 30 according to this embodiment are described with reference to FIG. 2 and subsequent figures. FIG. 2 is a perspective view showing a specific configuration of the intake valve driving mechanism 30 according to the embodiment of FIG. 1, and FIGS. 3A to 3D, which are cross-sectional views showing a substantial part of the intake valve driving mechanism 30 including example components and elements. In FIGS. 3A to 3D, FIG. 3A shows a time when a valve lift is a value of 0 in a large lift controlling state, FIG. 3B shows a time when the valve lift is the maximum in the large lift controlling state, FIG. 3C shows a time when the valve lift is a value of 0 in a small lift controlling state, and FIG. 3D shows a time when the valve lift is the maximum in the small lift controlling state.

The intake valve driving mechanism 30 according to this embodiment includes a variable cam timing mechanism (VCT mechanism) 32, which is driven and coupled by a chain drive mechanism to the crankshaft 14. The chain drive mechanism includes in addition to a driven sprocket 104, a drive sprocket (not shown) of the crankshaft 14 and a chain wound around both sprockets.

The VCT mechanism 32 includes a case fixed to the driven sprocket 104 so as to rotate integrally, and a rotor accommodated in the case and fixed to an inner shaft 105 so as to rotate integrally. Between the case and the rotor, a plurality of hydrostatic chambers are formed around a center axis X (shown in FIGS. 3A to 3D) in an aligned state (circumferentially). Then, a liquid (for example, engine oil) pressurized by the pump is selectively supplied to each of the hydrostatic chambers to form a pressure difference between the hydrostatic chambers facing each other.

The engine controlling unit 100 as a VCT control unit outputs a control signal $\theta_{VCT\_D}$ to a magnetic valve 32a of the VCT mechanism 32, which the magnetic valve 32a receives to duty-control a hydraulic pressure so as to adjust the flow rate, pressure and the like of the liquid supplied to the hydrostatic chamber. This makes it possible to change the actual phase difference between the sprocket 104 and the inner shaft 105 to achieve a target rotation phase of the inner shaft 105 as is known. Incidentally, the VCT control unit may be configured as another configuration unit besides that of the engine controlling unit 100.

The inner shaft 105 has cams 106 of a disk shape provided integrally thereto corresponding to the respective cylinders (of which cylinder 11 is an example) as shown in FIGS. 3A to 3D. Cams 106 protrude eccentrically from the center of the axis of the inner shaft 105, and rotate with a phase defined by the VCT mechanism 32. Peripheries of eccentric cams 106 are fitted rotatably with inner peripheries of ring arms 107. When the inner shaft 105 rotates around the center axis X, the ring arms 107 revolve around the same center axis X and at the same time turns around the center of the eccentric cams 106.

Further, the inner shaft 105 is provided with a rocker connecter 110 for each of the respective cylinders of engine 1. Each rocker connecter 110 is a cylinder shape and inserted by the inner shaft 105 to be supported concentrically; in other words, rotatably supported around the center axis X. The peripheries of the rocker connecters 110 are made to be a bearing journal and rotatably supported by a bearing cap (not shown) provided to the cylinder head 13.

First rocker cams 111 and second rocker cams 112 are coupled to the rocker connecter 110. Configurations of both are the same, thus FIGS. 3A to 3D show one of the rocker cams 111, with a cam face 111a and a base face 111b of a circumferential shape (see FIG. 3D), which are slidable on the upper surface of a tappet 115. The rocker cam 111 does not continuously rotate, and presses the tappet 115 to open the valve similarly to the cam of a general intake valve driving mechanism except for oscillation. The tappet 115 is supported by a valve spring 116. The valve spring 116 is supported between holders 117 and 118 as is known.

Referring back to FIG. 2, above an assembly of the inner shaft 105 and the rocker cam components 110 to 112, a control shaft 120 is arranged. This control shaft 120 is rotatably supported by a bearing (not shown), and at an approximately central portion of the shaft in a longitudinal direction thereof provided integrally is a worm gear 121 of a coaxial shape protruding from the periphery.

The worm gear 121 engages with a worm 122. This worm 122 is fixed to the output shaft, for example, a stepping motor 123 which is an actuator of a variable valve lift mechanism (VVL). Therefore, the stepping motor 123, having received the control signal (valve lift signal) $\theta_{VVL\_D}$ from the engine controlling unit 100. operates the control shaft 120 so as to turn to a target position. The control shaft 120 turned in this way has control arms 131 attached for the respective cylinders 11 of engine 1, and these control arms 131 are turned integrally by the turning of the control shaft 120.

Additionally, the control arm 131 turned in this way is coupled to the ring arm 107 via a control link 132. That is, an end of the control link 132 is coupled rotatably to the tip of the control arm 131 with a control pivot 133, and the other end of the control link 132 is coupled rotatably to the ring arm 107 with a common pivot 134.

Here, the common pivot 134 couples the other end of the control link 132 to the ring arm 107 as described above, and penetrates through this ring arm 107 to rotatably couple the ring arm to the end of the a rocker link 135. Then, the other end of this rocker link 135 is rotatably coupled to rocker cam 111 with a rocker pivot 136, which makes it possible to transmit the rotation of the ring arm 107 to the rocker cam 111.

More specifically, when the inner shaft 105 rotates and the eccentric cam 106 integrally rotates, as shown in FIGS. 3A and 3C, then the eccentric cam 106 is positioned on the lower side, and the ring arm 107 is also positioned on the lower side. On the other hand, as shown in FIGS. 3B and 3D, if the eccentric cam 106 is positioned on the upper side, then the ring arm 107 is also positioned on the upper side.

On this occasion, a position of the common pivot 134 coupling the ring arm 107 and the control link 132 is defined by the position relationship of three of the positions of the control pivot 133, and the common center positions of the eccentric cams 106 and the ring arm 107. Thus, if the position of the control pivot 133 does not vary (the control shaft 120 does not rotate) as is shown in the figure, the common pivot 134 reciprocates approximately vertically in response to only the rotation about the common centers of the eccentric cams 106 and the ring arms 107.

Such a reciprocation of the common pivot 134 is transmitted to the first rocker cam 111 by the rocker link 135, and swings the first rocker cam 111 around the center axis X together with the rocker cam 112 coupled to the cam 111 by the rocker connecter 110. The rocker cam 111 swung in this way, as shown in FIGS. 3B and 3C, presses down the tappet 115 against a spring force of the valve spring 116 while the cam face 111a is contacting with the upper surface of the tappet 115, and the tappet 115 presses down the intake valve 21 to open the intake port 18.

Meanwhile, as shown in FIGS. 3A and 3D, when the base face 111a of the rocker cam 111 comes into contact with the upper surface of the tappet 115, the tappet 115 is not pressed down. This is because the radius of the base surface 111b of the rocker cam 111 centering on the center axis X is set to be equal to the distance between the center axis X and the upper surface of the tappet 115 or less.

In a relationship among the control pivot 133, the common pivot 134 and a common center of the eccentric cam 106 and ring arm 107 as described above, the position change of the control pivot 133 generates the position variation among the three; thus, the common pivot 134 traces a locus different from the above, to reciprocate.

Therefore, an operation of a motor 123 rotates the control shaft 120 and the control arm 131 to change the position of the control pivot 133, which makes it possible to change the swing range of the rocker cams 111 and 112. For example, if the control arm 131 is turned in a clockwise direction in FIGS. 3A to 3D to shift the control pivot 133 from a position shown in FIG. 3A to the left upper side as shown in FIG. 3C, the swing range of the rocker cam 111 may be such that the base surface 111b relatively is more likely to contact with the upper surface of the tappet 115.

Figure 4:
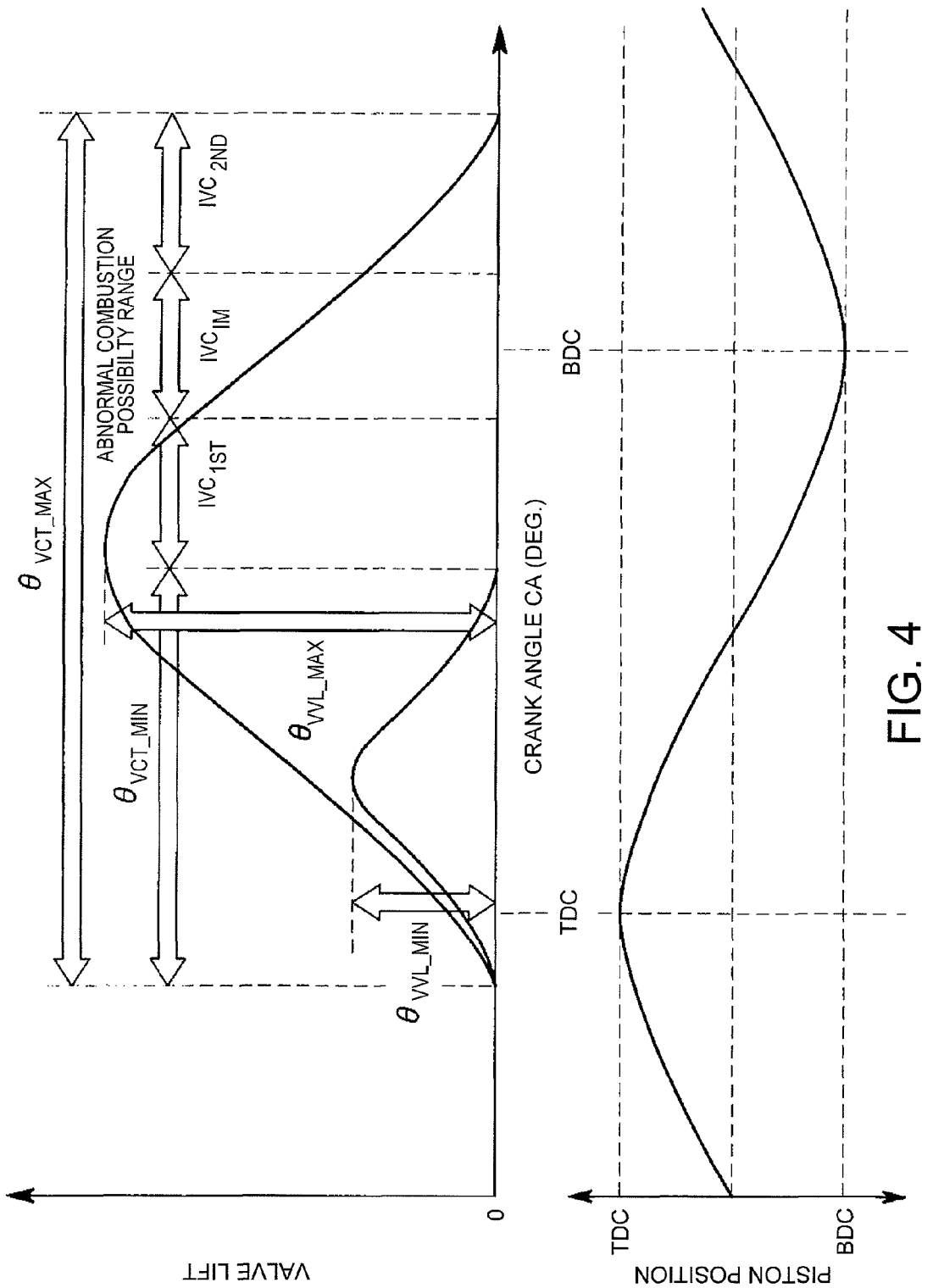
FIG. 4 is graphs showing a setting example of the intake valve driving mechanism of this embodiment.

FIG. 4 is a graph showing a setting example of the intake valve driving mechanism 30 according to the embodiment.

With reference to FIG. 4, in this embodiment, a valve lift $\theta_{VVL}$ is controlled in a range; for example, from $\theta_{VVL\_min}$ to $\theta_{VVL\_max}$ by the intake valve driving mechanism 30 described above and the relating constituent components as a target amount CE of air to be inducted into each cylinder 11 increases, and the intake valve closing timing is retarded in a range from $\theta_{VCT\_min}$ to $\theta_{VCT\_max}$ as the valve lift $\theta_{VVL}$ increases. The opening operation timing and the closing operation timing of the intake valve 21 may be any combination as needed, for example, a lost motion in which the valve lift is 0 (zero) may be possible.

In this embodiment, for example, when the intake valve 21 is opened and closed during intake strokes in which the engine speed $N_{ENG}$ is 1500 rpm, in this embodiment, the opening timing of the intake valve 21 starts opening the valve immediately before the exhaust top dead center (for example, crank angle of 20° CA before the top dead center) in the most operating range and changes the closing timing in response to the target air charge amount.

Here, in this embodiment, the closing timing of the intake valve 21 may be set to occur during, a first range $IVC_{1st}$, which is advanced from the intake valve closing timing with which a target air charge amount CE is maximized at the engine speed $N_{ENG}$, and a second range $IVC_{2nd}$, which is retarded from the intake valve closing timing with which a target air charge amount CE is maximized at the engine speed $N_{ENG}$ and separated from the first range $IVC_{1st}$. There is a configuration in which it is possible to set modes to include: an earlier closing mode $M_{EIVC}$ for driving such that the intake valve 21 closes in the first range $IVC_{1st}$, a later closing mode $M_{LIVC}$ for driving such that the intake valve 21 closes in the second range $IVC_{2nd}$, an advance transition mode $M_{TR-A}$ for switching the driving mode from the later closing mode $M_{LIVC}$ to the earlier closing mode $M_{EIVC}$, and a retard transition mode $M_{TR-R}$ for switching the driving mode from the earlier closing mode $M_{EIVC}$ to the later closing mode $M_{LIVC}$. Incidentally, both first and second ranges are set to include the intake valve closing timing with which the target air charge amount CE is maximized at the engine speed $N_{ENG}$, and is not necessarily to be set using an intake bottom dead center as a reference, as described below in detail (see FIGS. 14A and 14B, described later).

The earlier closing mode $M_{EIVC}$ is a mode which is selected when an engine operation condition is a low-load condition and in which the valve lift $\theta_{VVL}$ of the intake valve 21 is made smaller and the intake valve closing timing is advanced from the intake bottom dead center; for example, corresponding to the valve lift $\theta_{VVL}$.

On the other hand, the later closing mode $M_{LIVC}$ is a mode which is selected when the engine operation condition is a high-load condition and in which the valve lift $\theta_{VVL}$ of the intake valve 21 is made greater and the intake valve closing timing is retarded beyond the intake bottom dead center corresponding to a greater valve lift $\theta_{VVL}$.

Here, in this embodiment, the second range $IVC_{2nd}$ (in which the later closing mode $M_{LIVC}$ is set) is retarded and separated from the first range $IVC_{1st}$ in which the earlier closing mode $M_{EIVC}$ is set. Therefore, an intermediate range $IVC_{IM}$ in which the intake valve 21 is not closed is set between the valve closing timing ranges $IVC_{1st}$ and $IVC_{2nd}$.

Next, the reason why the above driving modes are set is described.

In order to decrease an effective compression ratio to suppress occurrence of abnormal combustion in an engine having a greater expansion ratio for the increased engine output and the reduced fuel consumption, the closing timing of the intake valve 21 can be either advanced or retarded from a timing with which amount of air inducted into the cylinder is maximized at a given engine speed. If the intake valve closing timing is advanced from that timing at the given engine speed, the swing of the rocker cam 111 becomes smaller and resistance of the valve spring 116 also becomes smaller, which improves engine operating efficiency and is preferable in the low-load condition, as is clear from FIGS. 3A and 3B. However, the closing timing of the intake valve 21 for obtaining a predetermined cylinder air charge amount is retarded as the engine speed increases as a result of an increase of the engine torque. Further, limiting the target intake valve closing timing towards the advanced side is less needed as the engine speed is greater because higher engine speed can enhance fluidity of air-fuel mixture in a cylinder and the possibility of abnormal combustion is decreased. Accordingly, the closing timing of the intake valve 21 is necessarily retarded at higher rate as the engine speed increases. However, it is difficult to retard the closing timing of the intake valve 21 at higher rate toward a target intake valve closing timing due to the delay of response of the intake valve driving mechanism 30. This may cause the actual intake valve closing timing to occur earlier than the target intake valve closing timing, which may result in decreasing the cylinder air charge amount.

On the other hand, if the intake valve closing timing IVC is retarded from a timing with which the amount of air inducted into the cylinder is maximized at a given engine speed, the air is inducted into the cylinder 11 until the piston 15 reaches the bottom dead center. Then, the air in the cylinder is returned to the intake passage during an upward motion of the example piston 15 after the bottom dead center to reduce the effective compression ratio. In order to achieve this, it is necessary to set the valve lift and the valve operation range of the intake valve 21 to around the maximum value (see FIG. 4), which may result in increasing mechanical loss.

Therefore, in this embodiment, the first range $IVC_{1st}$ and the second range $IVC_{2nd}$ are set to utilize a greater expansion ratio of a high compression ratio engine while taking measures to regulate abnormal combustion such as knocking in the intermediate range $IVC_{IM}$ with higher possibility of the abnormal combustion, thereby improving the output and reduce the fuel consumption in a continuous, broader operating range.

In order to attain such a configuration, example methods are provided below with reference to FIGS. 5 and 6.

Figure 5:
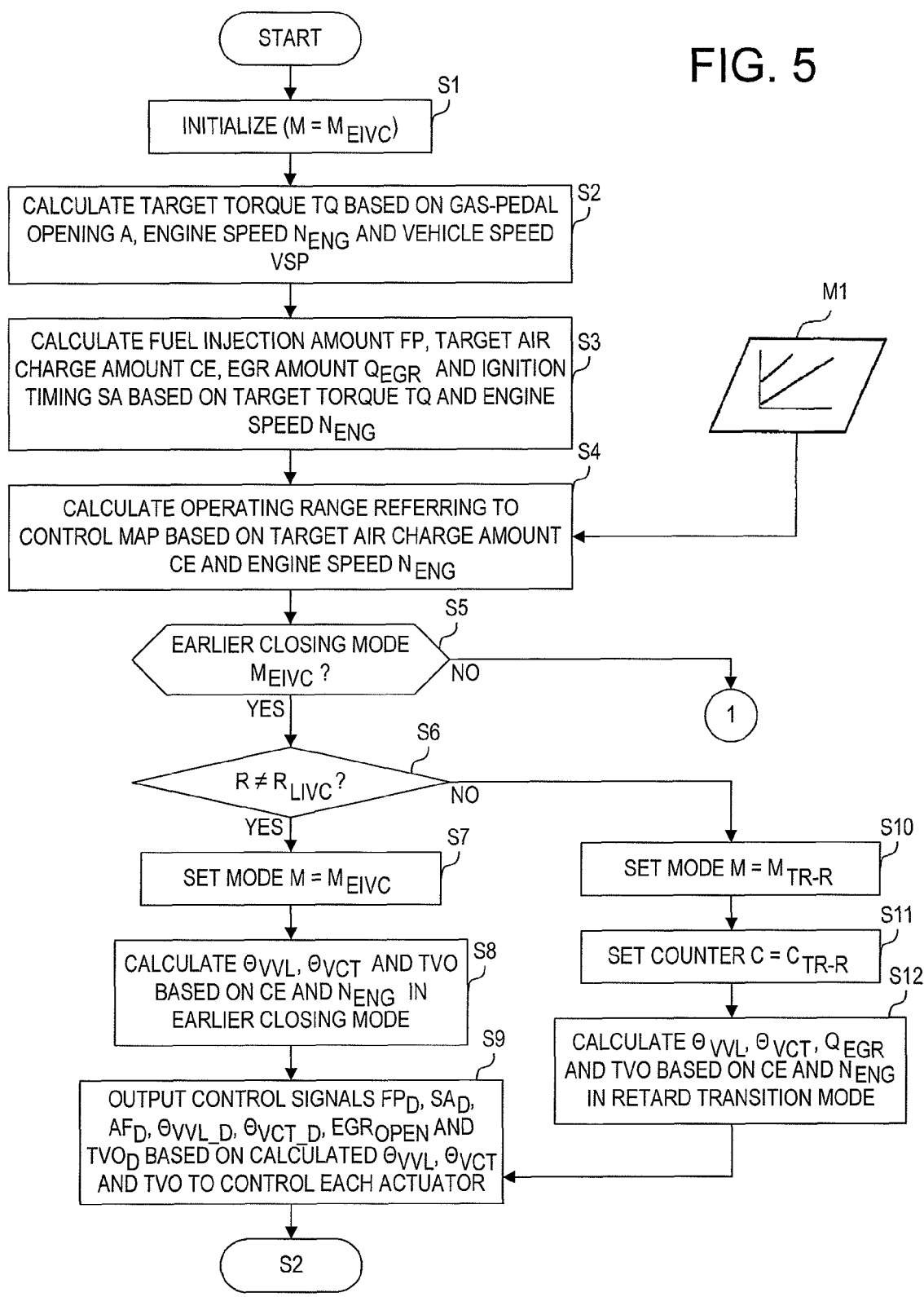
FIG. 5 is a flowchart showing a control example of an engine of this embodiment.
Figure 6:
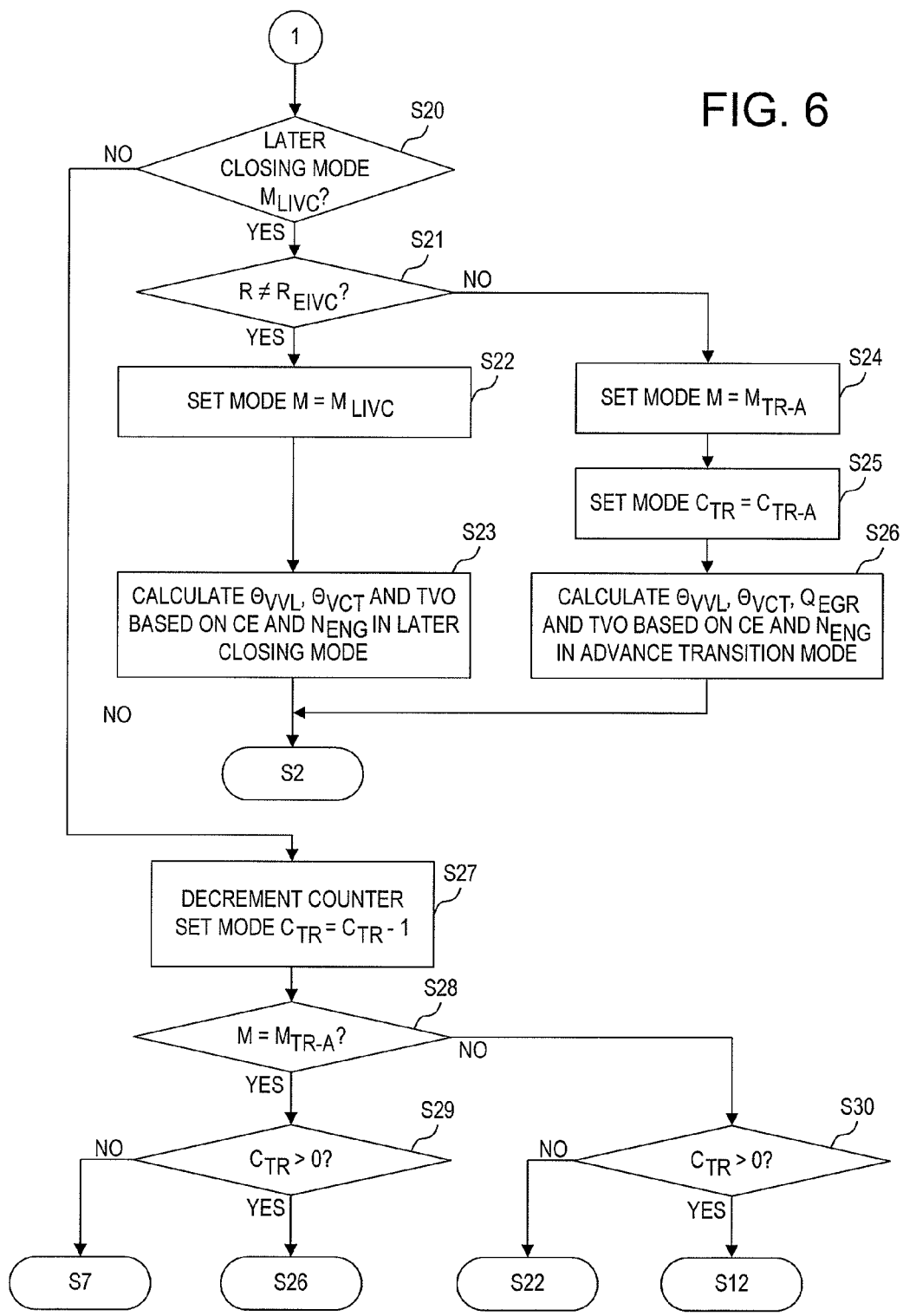
FIG. 6 is a flowchart showing the control example of the engine of this embodiment, which is continued from FIG. 5.

FIGS. 5 and 6 are the flowcharts showing example control methods for controlling the engine 1 according to the embodiment of the invention.

First, with reference to FIG. 5, the engine controlling unit 100 executes initialization of various settings (step S1). In this initialization, the engine controlling unit 100 sets a current operation mode M to the earlier closing mode $M_{EIVC}$.

Next, the engine controlling unit 100 reads or calculates a gas-pedal opening signal a from the gas-pedal opening sensor 75, the engine speed $N_{ENG}$ based on a crank angle pulse signal, and the vehicle speed signal VSP from the vehicle speed sensor 76 to calculate a target torque TQ based on the information (step S2).

Next, the engine controlling unit 100 calculates the fuel injection amount FP (or air-fuel ratio), the target air charge amount CE, the EGR amount $Q_{EGR}$ and the ignition timing SA based on the target torque TQ and the engine speed $N_{ENG}$ (step S3).

Then, the engine controlling unit 100 reads data of a control map M1 stored in the memory in advance, and determines a current operating range R fitted to values of the target air charge amount CE and the engine speed $N_{ENG}$ based on this control map M1 (step S4). As a result, the engine controlling unit 100 determines the operating range as shown in FIG. 7.

Figure 7:
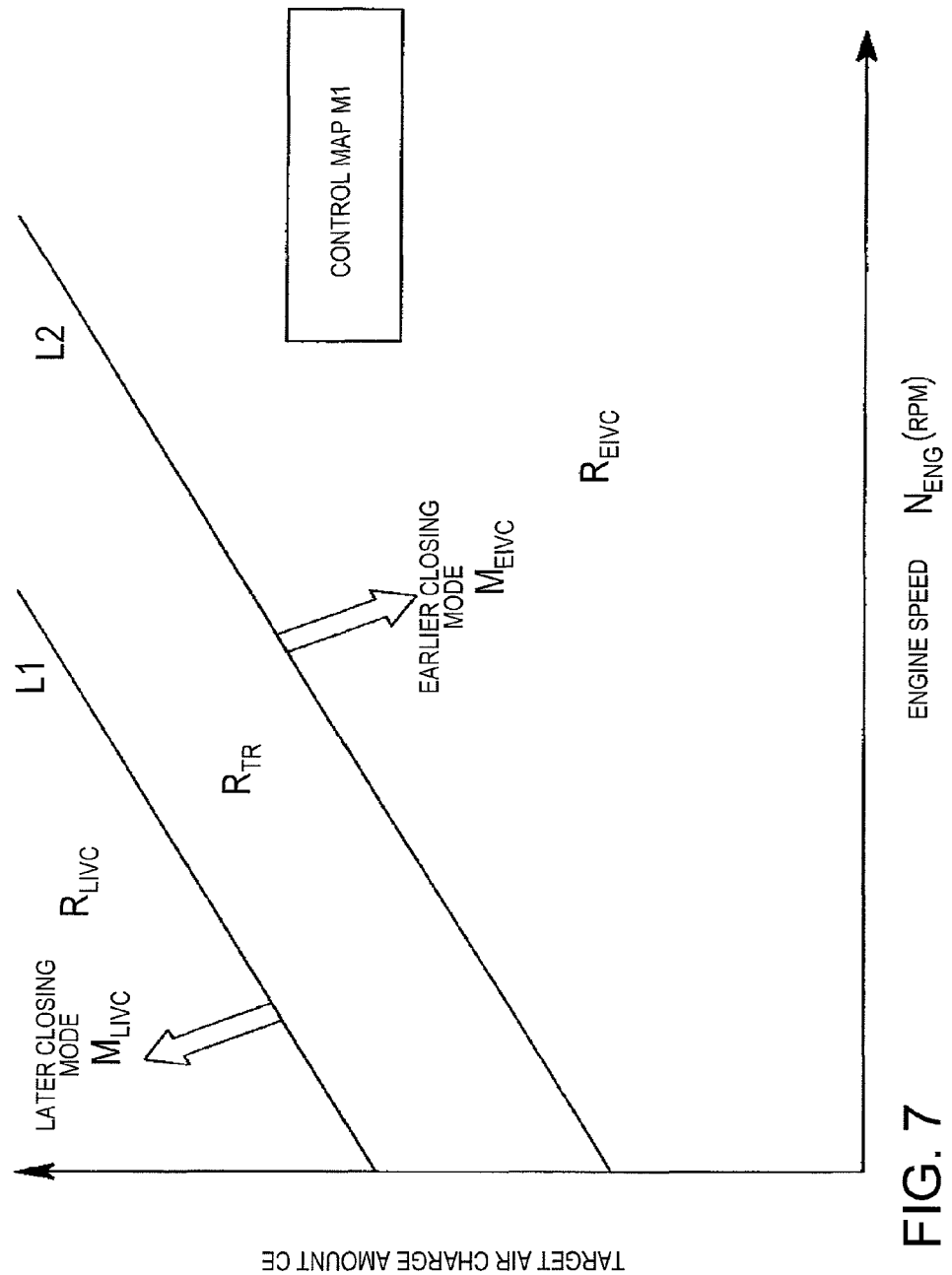
FIG. 7 is a characteristic graph showing an example of an operating range determined in the flowchart of FIG. 5.

FIG. 7 is a characteristic graph showing an example of the operating range determined in the flowchart of FIG. 5.

As shown in FIG. 7, in this embodiment, characteristics L1 and L2 (an example of the predetermined air charge amount) proportional to the engine speed $N_{ENG}$ are set, and there are set such that the later closing mode $M_{LIVC}$ is selected in the operating range $R_{LIVC}$ which is on the high-load side of the high-load characteristic L1 or more, and the earlier closing mode $M_{EIVC}$ is selected in the operating range $R_{EIVC}$ which is on the low-load side of the low-load characteristic L2 or less. In the example shown, a transient range $R_{TR}$ between the characteristic L1 and the characteristic L2 is a range where hysteresis is provided and used for switching the operation mode. The operation mode is kept in the earlier closing mode $M_{EIVC}$ until the engine speed and target air charge amount exceeds the characteristic L1, even if the target air charge amount leaves the operating range $R_{EIVC}$. And, the operation mode is kept in the later closing mode $M_{LIVC}$ until the engine speed and target air charge amount exceeds the characteristic L2, even if the target air charge amount leaves the operating range $R_{LIVC}$. Incidentally, it may be that the later closing mode $M_{LIVC}$ and the earlier closing mode $M_{EIVC}$ are selected with the range partitioned by a single characteristic without this hysteresis.

With reference to FIG. 5, the engine controlling unit 100 determines whether or not the current operation mode M is the earlier closing mode $M_{EIVC}$ (step S5). If the operation mode M is the earlier closing mode $M_{EIVC}$, the engine controlling unit 100 further determines the operating range R based on current target air charge amount CE and engine speed $N_{ENG}$, and determines whether the current operating range R is other than the later closing operating range $R_{LIVC}$; that is, whether the valve closing timing range IVC of the intake valve 21 is other than the second range $IVC_{2nd}$ (step S6). If the current operating range R is other than the later closing operating range $R_{LIVC}$, the engine controlling unit 100 sets the operation mode M to be the earlier closing mode $M_{EIVC}$ (step S7). Then, the engine controlling unit 100 calculates the valve lift $\theta_{VVL}$ of the intake valve 21, a valve opening period $\theta_{VCT}$ of the intake valve 21 and the throttle valve opening TVO based on the target air charge amount CE and the engine speed $N_{ENG}$ at this earlier closing mode $M_{EIVC}$ (step S8). The engine controlling unit 100 outputs the control signal $FP_D$, $EGR_{OPEN}$, $SA_D$, $\theta_{VVL\_D}$, $\theta_{VCT\_D}$ and $TVO_D$ corresponding to the calculated valve lift $\theta_{VVL}$, valve opening period $\theta_{VCT}$ and throttle valve opening TVO, as well as the fuel injection amount FP, EGR amount $Q_{EGR}$ and ignition timing SA calculated in step S3 to control the actuators of the intake valve driving mechanism 30 and the throttle valve 57. Thereafter, the process moves to step S2 to repeat the above described control.

Figure 8:
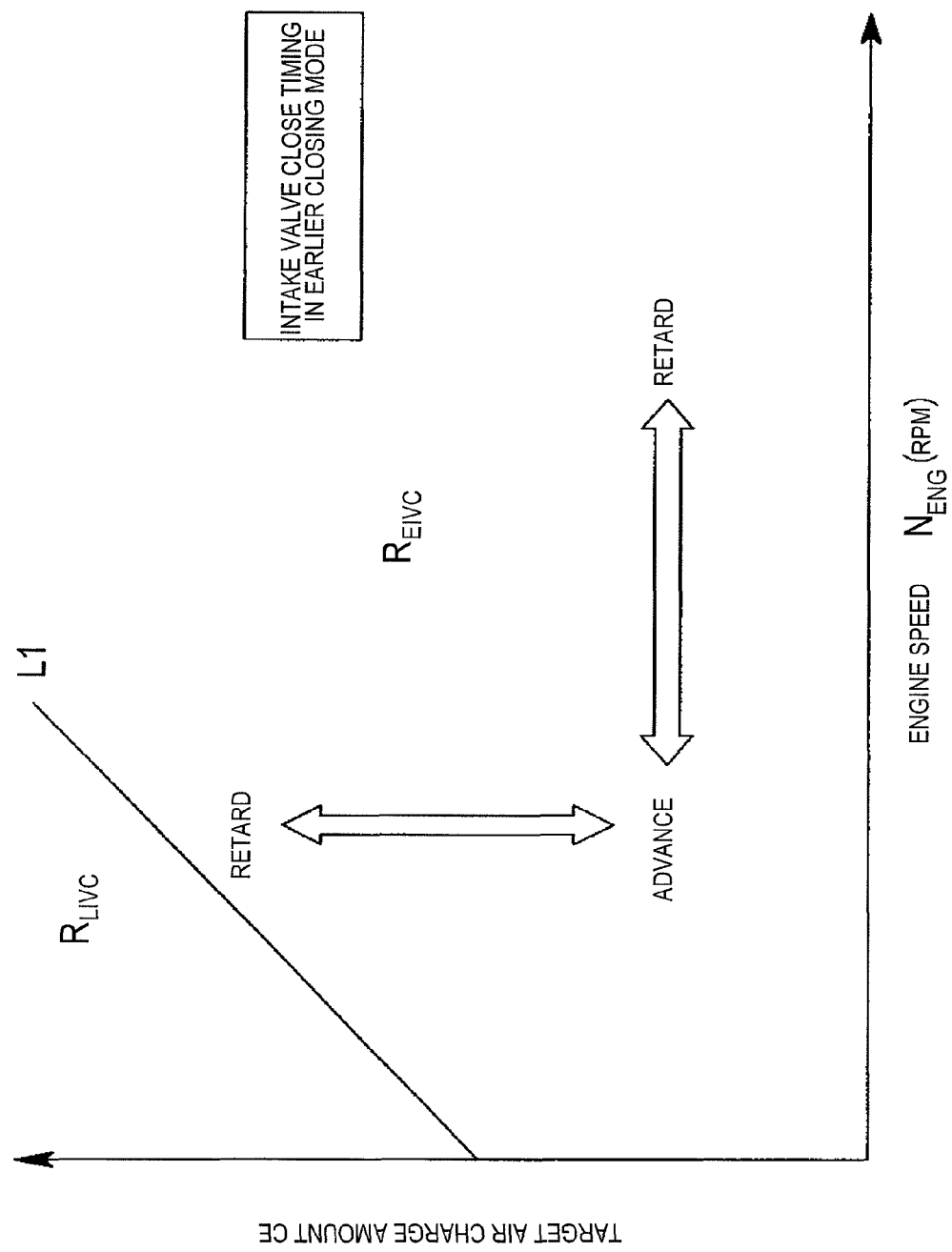
FIG. 8 is a graph showing a control example of an intake valve closing timing in an earlier closing mode set in the flowchart of FIG. 5.

FIG. 8 is a graph showing a control example of the intake valve closing timing in the earlier closing mode $M_{EIVC}$ set in the flowchart of FIG. 5.

With reference to FIG. 8, in the control example shown in the figure, when the operating range R is other than the later closing range $R_{LIVC}$ (that is, when the valve closing timing of the intake valve 12 is in the first range $IVC_{1st}$), the higher the engine speed $N_{ENG}$ is, the later the closing timing of the intake valve 21 is. Further, as the target air charge amount CE increases, the more the closing timing of the intake valve 21 retarded. As a result, during operation in the first range $IVC_{1st}$, the closing timing of the intake valve 21 is retarded to increase the air charge amount CE, thereby enabling torque output to match target torque.

Figure 9:
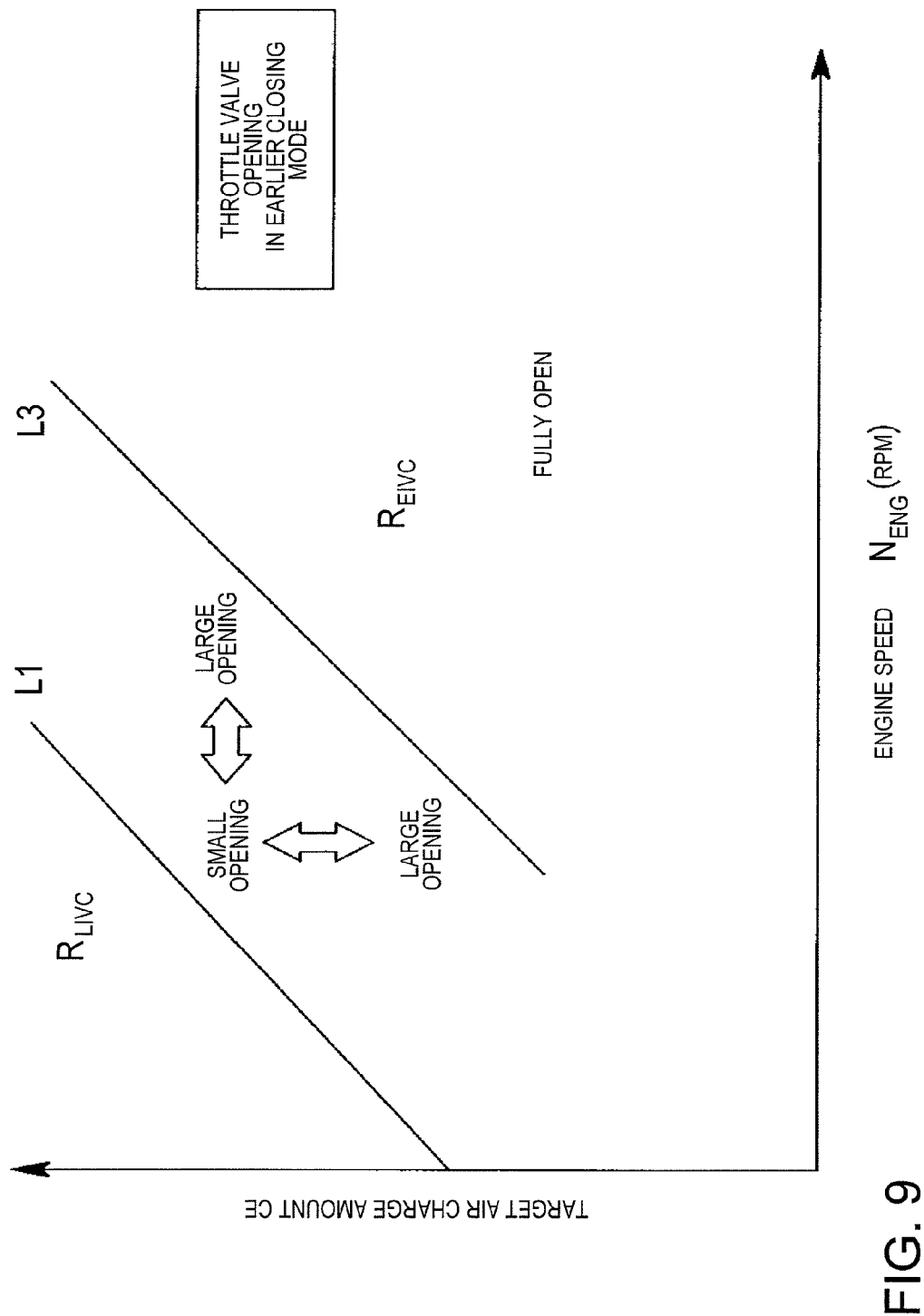
FIG. 9 is a graph showing the control example of the intake valve closing timing in the earlier closing mode set in the flowchart of FIG. 5.

FIG. 9 is a graph showing a control example of the throttle valve opening in the earlier closing mode $M_{EIVC}$ set in the flowchart of FIG. 5.

With reference to FIG. 9, in the control example shown in the figure, a characteristic L3 parallel to the characteristic L1 and proportional to the engine speed $N_{ENG}$ is set on the low-load side. The characteristic L3 may be on the low-load side of the characteristic L2 (as shown in FIG. 8), or may be equal to or greater than the characteristic L2 as long as the characteristic L3 is smaller than the characteristic L1. In the operating range on the low-load side of this characteristic L3, the throttle valve opening TVO is set to be fully opened, and the target air charge amount CE is substantially controlled by the closing timing of the intake valve 21. Therefore, enough air charge amount CE is obtained, making it possible to control so as not to generate pumping loss. Meanwhile, control is performed such that the throttle valve opening TVO decreases in a range from the characteristic L3 to the characteristic L1, as the target load increases or the engine speed $N_{ENG}$ decreases. For this reason, as the operation condition changes from a middle high-speed, low middle-load operating range to the low-speed, high-load operating range where the operation mode M needs to be set to the later closing mode $M_{LIVC}$, the pressure in the intake passage including the intake port 18 downstream of the throttle valve 57 is reduced. This makes it possible in this embodiment employing a high compression ratio engine, to inhibit the cylinder air charge amount from temporarily becoming too large as a result of the variation of the closing period, which in turn may avoid abnormal combustion such as pre-ignition, even in a transient and unsteady operating range where the operation mode M is switched.

Next, with reference to FIG. 5, in step S6, in a case that the current operating range R is the later closing range $R_{LIVC}$ (NO, in step S6), the engine controlling unit 100 sets the operation mode M to the retard transition mode $M_{TR-R}$ (step S10). Then, the engine controlling unit 100 sets a predetermined count time period $C_{TR-R}$ as a count value $C_{TR}$ (step S11). Based on the target air charge amount CE and the engine speed $N_{ENG}$ in the retard transition mode $M_{TR-R}$, the valve lift $\theta_{VVL}$ of the intake valve 21, the valve timing $\theta_{VCT}$ of the intake valve 21, the EGR amount $Q_{EGR}$ and the throttle valve opening TVO are calculated (step S12). The reason for providing the predetermined count time period $C_{TR-R}$ is in order for the charge amount CE to be provisionally reduced to prevent abnormal combustion (such as pre-ignition) until the shift of the closing timing of the intake valve 21 from the first range $IVC_{1st}$ to the second range $IVC_{2nd}$.

After step S12 is executed, the process moves to step S9 to output the control signal $FP_D$, $EGR_{OPEN}$, $SA_D$, $\theta_{VVL\_D}$, $\theta_{VCT\_D}$ and $TVO_D$ corresponding to the valve lift $\theta_{VVL}$, valve timing $\theta_{VCT}$, EGR amount $Q_{EGR}$, throttle valve opening TVO calculated in the retard transition mode $M_{TR-R}$, as well as the fuel injection amount FP and ignition timing SA calculated in step S3, thereby controlling the actuators of the intake valve driving mechanism 30 and the throttle valve 57. Thereafter, the process moves to step S2 to repeat the above described control.

Figure 10:
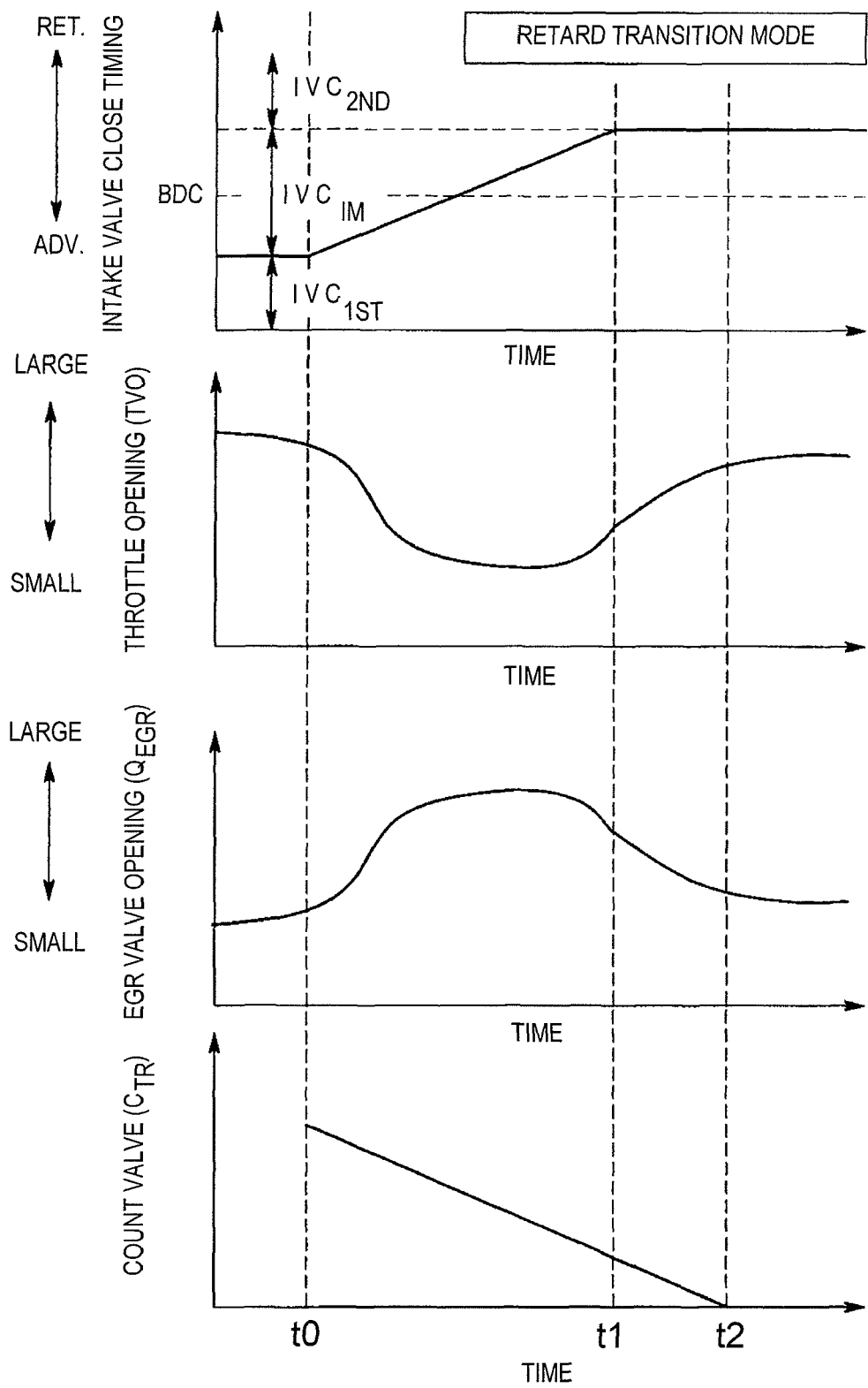
FIG. 10 is a timing chart showing a control example in a retard transition mode in the flowchart of FIG. 5.

FIG. 10 is a timing chart showing a control example in the retard transition mode $M_{TR-R}$ according to the flowchart in FIG. 5.

As shown in FIG. 10, when control is executed in the retard transition mode $M_{TR-R}$, the count value $C_{TR}$ is decremented from a start timing t0 thereof (see step S27 in FIG. 6), and the control ends at a timing t2. The intake valve driving mechanism 30 starts retarding in order to shift the closing timing of the intake valve 21 to the second range $IVC_{2nd}$ from the timing t0 when the counting starts. On this occasion, the throttle valve opening TVO reduces in proportion as a closing timing of the intake valve 21 is retarded, thereby reducing the intake passage pressure. This makes it possible to prevent abnormal combustion with reduction of the intake passage pressure even if the intake valve 21 of the cylinder 11 is brought into the intermediate range $IVC_{IM}$ having a possibility of abnormal combustion such as pre-ignition. Similarly, the opening (EGR amount) $Q_{EGR}$ of the EGR valve 63 increases in proportion as the closing timing of the intake valve 21 is retarded. This causes the outer EGR gas to be inducted into the cylinder. The outer EGR gas has a lower temperature than an inner EGR gas, i.e., the gas remaining in the cylinder, allowing abnormal combustion to be prevented more surely.

Various settings are made such that transition of the closing timing of the intake valve 21 ends at a timing t1 earlier than the timing t2 when counting ends. Additionally, at a time passing this timing t1, $Q_{EGR}$ and TVO (set in step S12 is switched similarly to the later closing mode $M_{LIVC}$, ending the transition of the operation mode.

With reference to the flowchart of FIG. 6, description is given of a control example when it is determined NO at the step S5 of the flowchart shown in FIG. 5, in other words, when the operation mode M, set in the engine controlling unit 100, is not the earlier closing mode $M_{EIVC}$.

If the operation mode M is not the earlier closing mode $M_{EIVC}$, the engine controlling unit 100 further determines whether or not the operation mode M is the later closing mode $M_{LIVC}$ (step S20). If the operation mode M is the later closing mode $M_{LIVC}$, the engine controlling unit 100 further determines the operating range R based on the current target air charge amount CE and the engine speed $N_{ENG}$, and determines whether the current operating range R is other than the earlier closing operating range $R_{EIVC}$; that is, whether the valve closing timing range IVC of the intake valve 21 is other than the first range $IVC_{1st}$ (step S21). If the current operating range R is other than the earlier closing operating range $R_{EIVC}$, the engine controlling unit 100 sets the operation mode M to the later closing mode $M_{LIVC}$ (step S22). Subsequently, the engine controlling unit 100 calculates the valve lift $\theta_{VVL}$ of the intake valve 21, the valve timing $\theta_{VCT}$ of the intake valve 21 and the throttle valve opening TVO based on the target air charge amount CE and the engine speed $N_{ENG}$ in this later closing mode $M_{LIVC}$, (step S23). The engine controlling unit outputs the control signal $FP_D$, $EGR_{OPEN}$, $SA_D$, $\theta_{VVL\_D}$, $\theta_{VCT\_D}$ and $TVO_D$ corresponding to the calculated valve lift $\theta_{VVL}$, valve opening period $\theta_{VCT}$ and throttle valve opening TVO, as well as the fuel injection amount FP, EGR amount $Q_{EGR}$ and ignition timing SA calculated in step S3, thereby controlling the actuators of the intake valve driving mechanism 30 and the throttle valve 57. Thereafter, the process moves to step S2 to repeat the above described control.

Figure 11A:
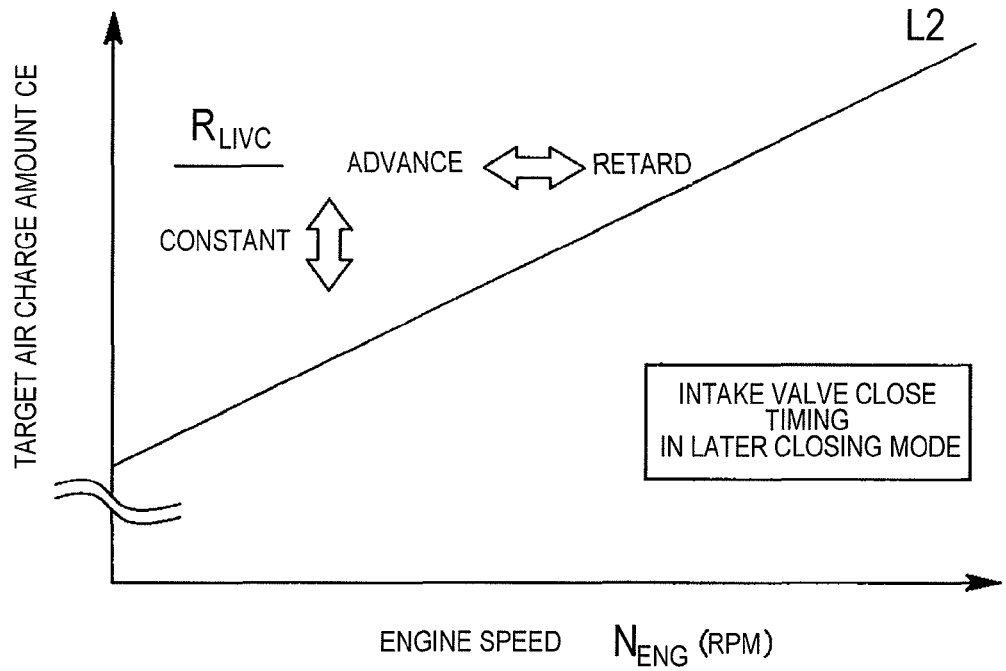
FIGS. 11A and 11B are graphs showing an intake valve closing timing in a later closing mode set in the flowchart of FIG. 6, where
Figure 11B:
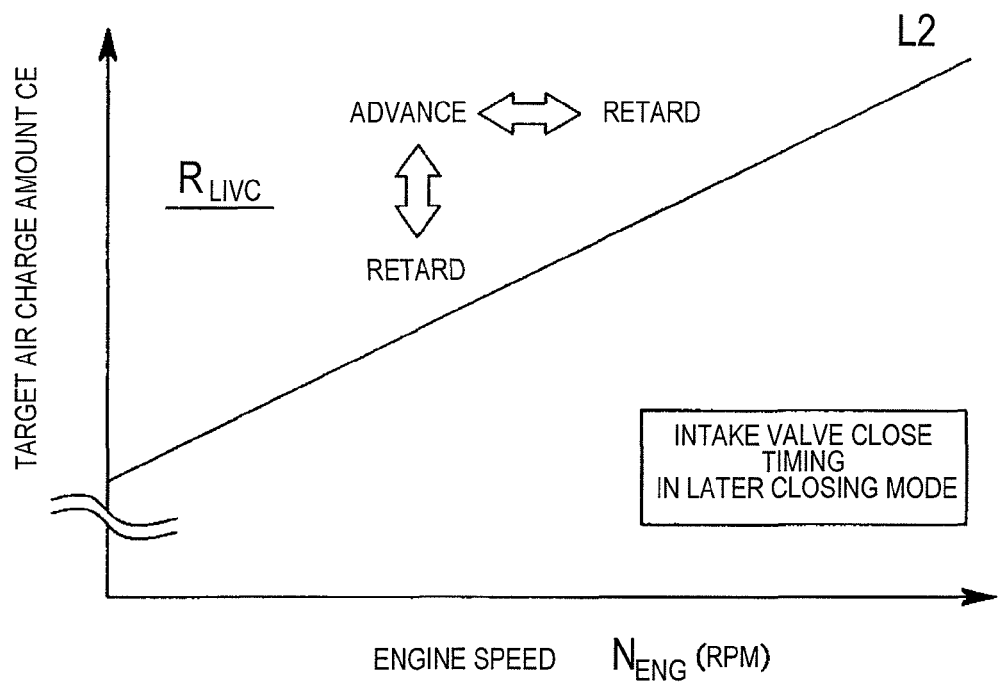
Figure 12A:
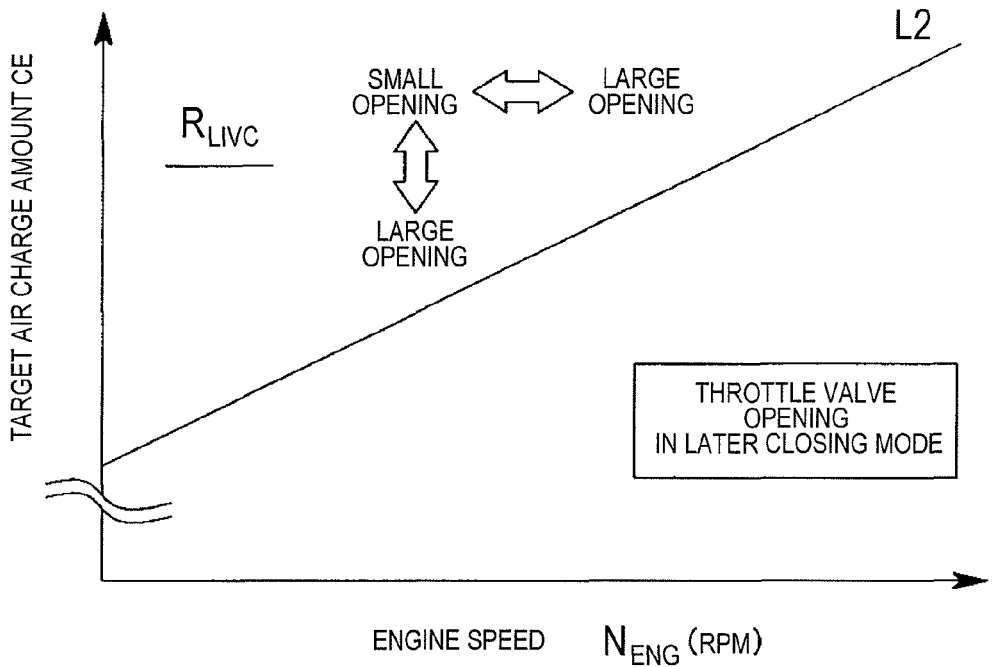
FIGS. 12A and 12B are graphs showing a control example of the throttle valve opening in the later closing mode set in the flowchart of FIG. 6, where
Figure 12B:
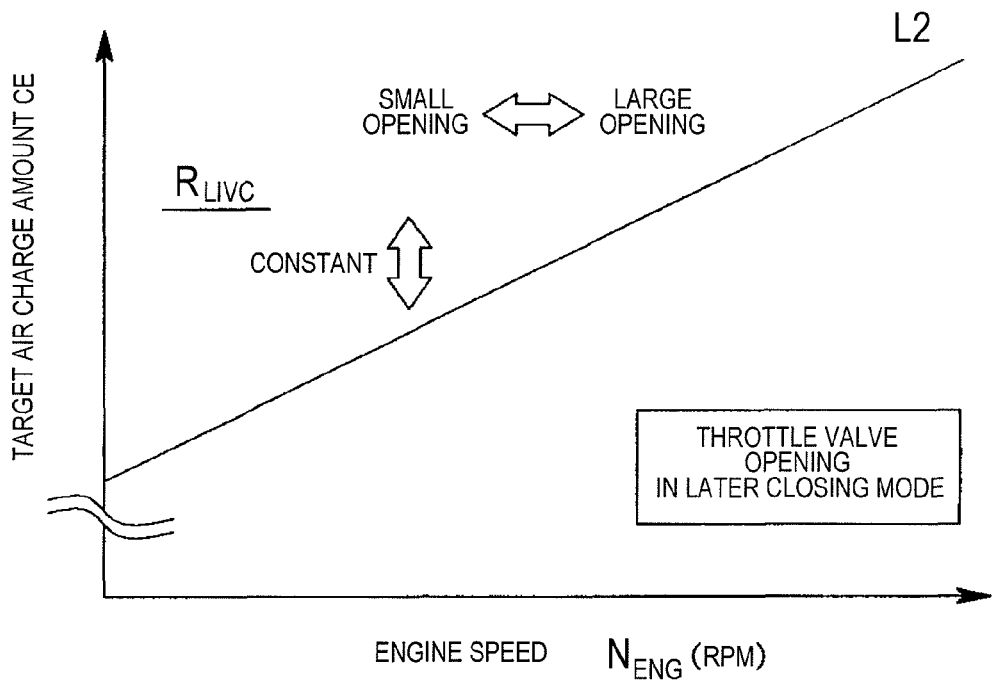

FIGS. 11A and 11B are graphs showing a control example of the intake valve closing timing in the later closing mode $M_{LIVC}$ set in the flowchart of FIG. 6. FIGS. 12A and 12B are graphs showing a control example of the throttle valve opening in the later closing mode $M_{LIVC}$ set in the flowchart of FIG. 6. In the respective graphs, FIGS. 11A and 12A illustrate a case of controlling the throttle valve opening in parallel depending on the target air charge amount CE, and FIGS. 11B and 12B illustrate cases when the throttle is controlled, maintaining the throttle valve opening at a constant value.

Referring to FIGS. 11A and 12A, if the target air charge amount CE is controlled while the throttle valve opening TVO is being changed in case the intake valve closing timing of intake valve 21 is in the second range $IVC_{2nd}$, the closing timing of the intake valve 21 is made constant regardless of the increase and decrease of the target air charge amount CE to control the pressure in the intake passage including the intake port 18 downstream of the throttle valve 57, thereby changing the cylinder air charge amount.

Meanwhile, as shown in FIGS. 11B and 12B, if the intake valve closing timing is advanced as the target air charge amount CE increases with the throttle valve opening TVO being maintained at a constant value under a condition of the constant engine speed, the intake valve closing timing comes close to the valve closing timing with which the maximum cylinder air charge at a given time would be obtained as it advances in the second valve closing timing $IVC_{2nd}$, to control the cylinder air charge amount. At the given time, the throttle valve opening TVO is maintained constant at a relatively larger value to keep the pressure in the intake passage high, thereby maintaining a state of low pumping loss.

In both cases of FIGS. 11A and 11B, the higher the engine speed $N_{ENG}$, the more the closing timing of the intake valve 21 is retarded. Further, in both cases of FIGS. 12A and 12B, the higher the engine speed $N_{ENG}$, the more the throttle valve opening TVO is controlled. Thus, the higher the engine speed $N_{ENG}$, the more the intake air inertia increases, and the intake valve closing timing is retarded such that the target air charge amount CE is maximized according to the engine speed $N_{ENG}$. In this way, control of the intake valve closing timing and the throttle valve may provide the required target air charge amount CE.

Returning now to FIG. 6, if the valve closing timing range IVC of the intake valve 21 based on the current target load is found to be in the first range $IVC_{1st}$ in step S21 (i.e., "NO" in step S21), the engine controlling unit 100 sets the operation mode M to the advance transition mode $M_{TR-A}$ (step S24). The $M_{TR-A}$ mode may include the engine controlling unit 100 setting a predetermined count time period $C_{TR-A}$ as to the count value $C_{TR}$ (step S25), and calculating the valve lift $\theta_{VVL}$ of the intake valve 21, the valve opening period $\theta_{VCT}$ of the intake valve 21, the EGR amount $Q_{EGR}$ and the throttle valve opening TVO based on the target air charge amount CE and engine speed NENG.

After executing step S26, the process moves to step S9, and the engine controlling unit outputs the control signal $FP_D$, $EGR_{OPEN}$, $SA_D$, $\theta_{VVL\_D}$, $\theta_{VCT\_D}$ and $TVO_D$ corresponding to the valve lift $\theta_{VVL}$, valve opening period $\theta_{VCT}$. Further the engine controlling unit may output EGR amount $Q_{EGR}$, and throttle valve opening TVO calculated in the advance transition mode $M_{TR-A}$, as well as the fuel injection amount FP and ignition timing SA calculated in step S3. By outputting such signals described above, the engine controlling unit thereby enables the control of the actuators of the intake valve driving mechanism 30 and the throttle valve 57. Thereafter, the process moves to step S2 to repeat the above described control.

Figure 13:
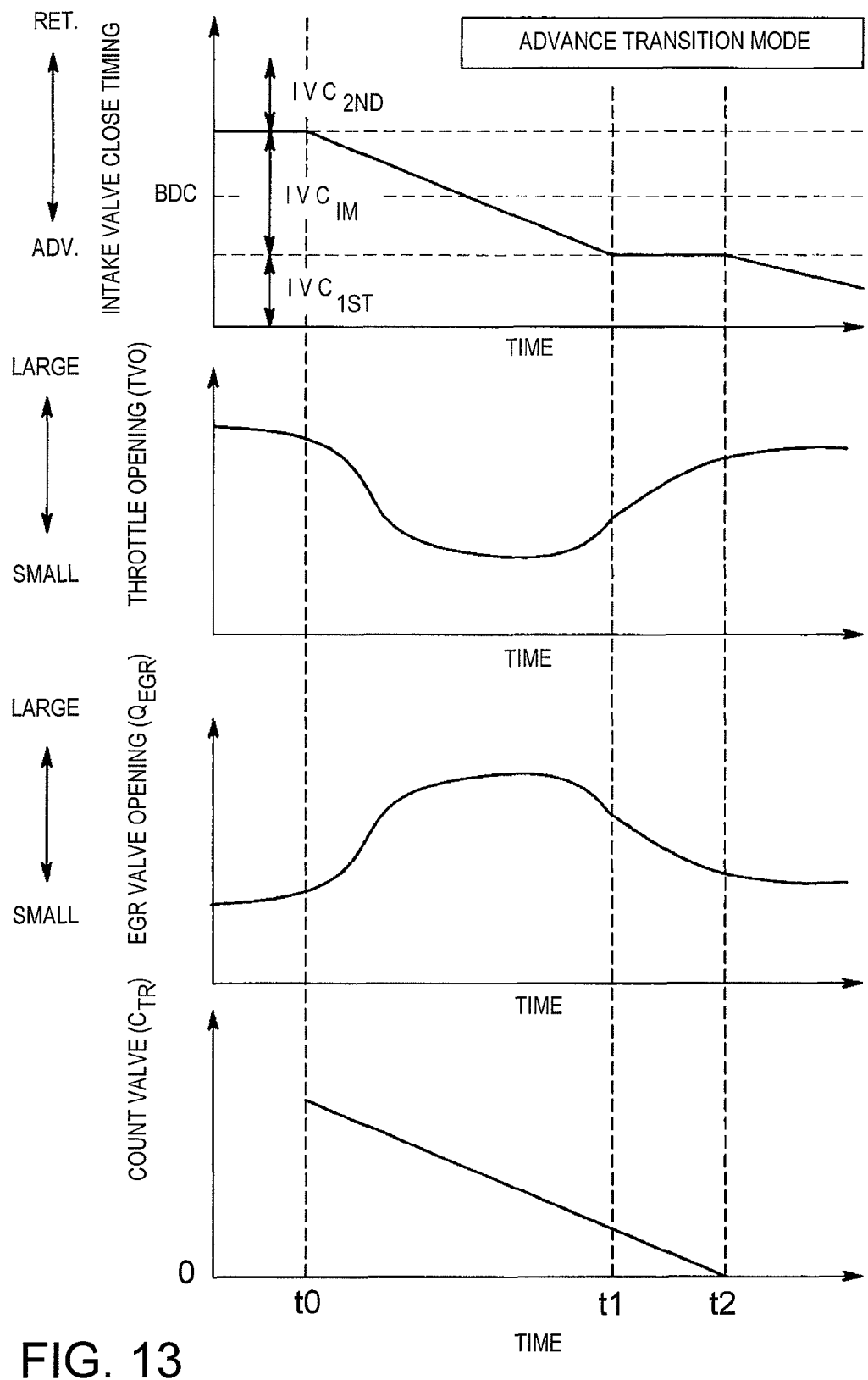
FIG. 13 is a timing chart showing a control example in an advance transition mode in the flowchart of FIG. 6.

FIG. 13 is a timing chart showing a control example in the advance transition mode $M_{TR-A}$ in the flowchart of FIG. 6.

As shown in FIG. 13, if control in the advance transition mode $M_{TR-A}$ is performed, the count value $C_{TR}$ is decremented from the start timing t0 (see step S27 in FIG. 6), and the control ends at a timing t2. The intake valve driving mechanism 30 starts advancing in order to shift the closing timing of the intake valve 21 to the first range $IVC_{1st}$ from the timing t0 when the counting starts. On this occasion, the throttle valve opening TVO reduces as the closing timing of the intake valve 21 is advanced, thereby reducing the intake passage pressure. This makes it possible to prevent abnormal combustion with reduction of the intake passage pressure even if the intake valve 21 of the cylinder 11 is brought into the intermediate range $IVC_{IM}$ having the possibility of abnormal combustion such as pre-ignition. Similarly, the opening of the EGR valve 63 (corresponding to EGR amount $Q_{EGR}$) increases in proportion as the closing timing of the intake valve 21 is advanced. This causes the relatively lower temperature outer EGR gas to be inducted into the cylinder, further suppressing abnormal combustion.

Various settings are made such that the transition of the closing timing of the intake valve 21 ends at the timing t1 earlier than the timing t2, when counting ends. Additionally, at a time passing this timing t1, $Q_{EGR}$ and TVO (set in step S26) are similarly switched to the earlier closing mode $M_{EIVC}$ to end the transition between operation modes.

Next, in the flowchart of FIG. 6, if the operation mode M set in the engine controlling unit 100 is not the later closing mode $M_{LIVC}$ (i.e., "NO" in step S20), the operation mode M is one of the retard transition mode $M_{TR-R}$ and the advance transition mode $M_{TR-A}$. Therefore, in this embodiment, firstly, the engine controlling unit 100 decrements the count value $C_{TR}$ (step S27), and determines whether or not the operation mode M is the advance transition mode $M_{TR-A}$ (step S28).

If the operation mode M is the advance transition mode $M_{TR-A}$, the engine controlling unit 100 determines whether or not the count value $C_{TR}$ is larger than 0 (step S29). If the count value CTR is larger than 0, the engine controlling unit 100 performs control of step S26 and subsequent steps. This allows the operation control to continue in the advance transition mode $M_{TR-A}$.

If the count value CTR is less than or equal to 0 in step S29, the process moves to step S7 and subsequent steps because the operation mode switching of the intake valve 21 by the intake valve driving mechanism 30 has already completed. The operation mode M is switched to the earlier closing mode $M_{EIVC}$, and the above described operation control in the earlier closing mode is repeated.

If the operation mode M is found to be the retard transition mode $M_{TR-R}$ in step S28, the engine controlling unit 100 determines whether or not the count value $C_{TR}$ is larger than 0 (step S30). If the count value $C_{TR}$ is larger than 0, the engine controlling unit 100 executes control of step S12 and subsequent steps. This allows the operation control to continue in the retard transition mode $M_{TR-R}$. On the other hand, if the count value $C_{TR}$ is found to be equal to or less than 0 in step S30, the process moves to step S22 and subsequent steps because the operation mode switching of the intake valve 21 by the intake valve driving mechanism 30 has already completed. The operation mode M is switched to the later closing mode $M_{LIVC}$, and then the above described operation control in the earlier closing mode is repeated.

Figure 14A:
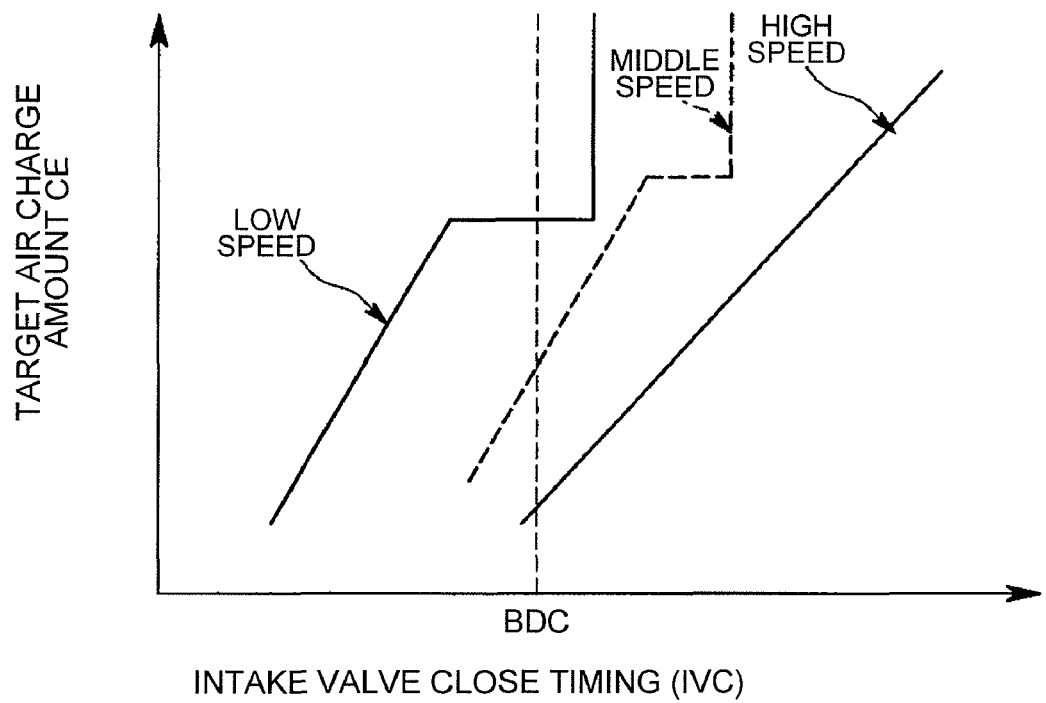
FIGS. 14A and 14B are graphs of the intake valve closing timing showing the control examples with which the flowcharts of FIGS. 5 and 6 are performed, where
Figure 14B:
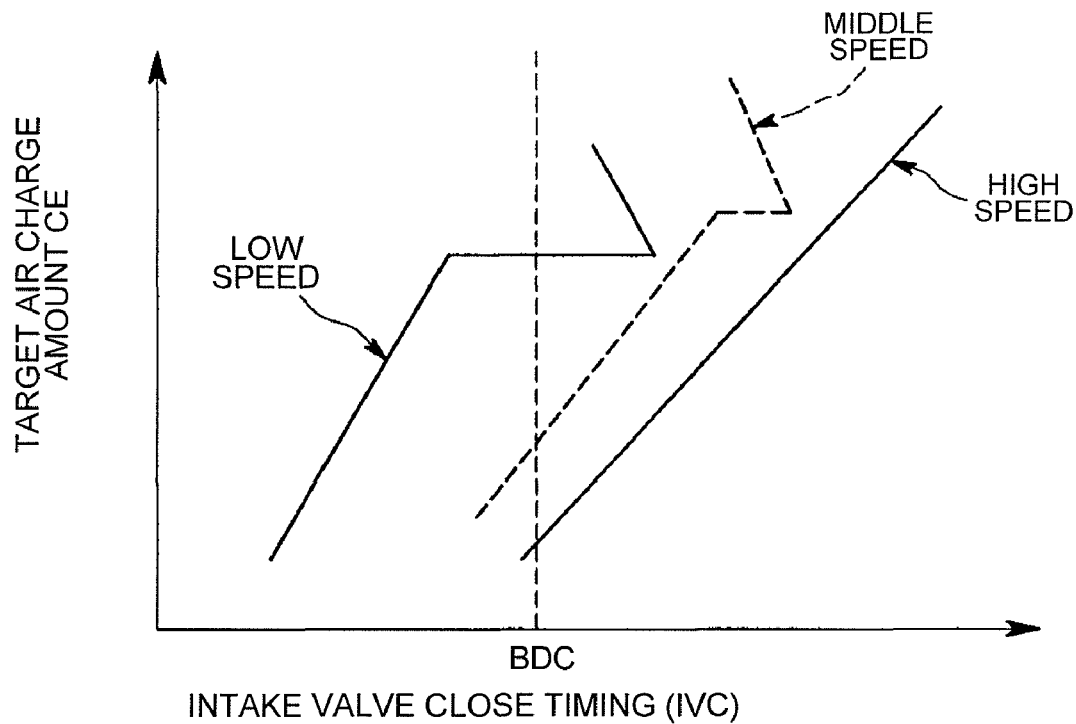

FIGS. 14A and 14B are graphs of the intake valve closing timing showing control examples resulting from methods carried out in the flowcharts of FIGS. 5 and 6. FIG. 14A represents a case where the throttle valve opening is changed while closing timing is in the later closing mode $M_{LIVC}$, and FIG. 14B represents a case where the throttle valve opening is maintained constant while changing the control of the intake valve closing timing in the later closing mode $M_{LIVC}$.

Referring to FIG. 14A, in the case of changing the throttle valve opening in the later closing mode $M_{LIVC}$, the target air charge amount CE may be controlled with the closing timing of the intake valve 21 being fixed to a most advanced timing, thereby minimizing the shift amount of the intake valve closing timing (turn angle of the control shaft 120 in FIGS. 3A to 3D) in switching from the earlier closing mode $M_{EIVC}$ to the later closing mode $M_{LIVC}$, resulting in allowing the time required to switch from the earlier closing mode MEIVC to be as short as possible.

On the other hand, referring to FIG. 14B, in the case of maintaining the throttle valve opening constant in the control of the intake valve closing timing in the later closing mode MLIVC, although the shift amount is made maximal (turn angle of the control shaft 120 in FIGS. 3A to 3D), during switching from the earlier closing mode $M_{EIVC}$ to the later closing mode $M_{LIVC}$, the intake passage pressure can be kept high, thereby allowing the pumping loss to be a minimum and high output to be maintained.

In both cases, since the intake valve closing timing is retarded as the engine speed $N_{ENG}$ increases, the higher the engine speed $N_{ENG}$ is, the smaller the intermediate range $IVC_M$ between the first range $IVC_{1st}$ and the second range $IVC_{2nd}$ is. Thus, the intake valve 21 closes almost in the first range $IVC_{1st}$ at certain engine speeds (2500 rpm, for example) or more, make any shift of the operation mode M unnecessary.

As described above, the embodiment provides an engine system including: the engine 1 having the cylinder 11 accommodating the piston 15 which reciprocates therein and defining the combustion chamber 17, the intake port 18 through which air is inducted into the combustion chamber 17, and the intake valve 21 capable of blocking the intake port 18 from the combustion chamber 17; the intake valve driving mechanism 30 as a variable valve operating system which is configured to substantially maintain the opening timing of the intake valve, and retards the closing timing of the intake valve 21 as the target amount CE of air to be inducted into each cylinder 11 increases; and the engine controlling unit 100 as the controller.

Further, included is a step where the engine controlling unit 100 closes the intake valve 21 in the first range $IVC_{1st}$, which is set to be advanced from the intake valve closing timing with which the target air charge amount CE is maximized at a given engine speed $N_{ENG}$ in each cylinder cycle, when the target amount CE of air to be inducted into the cylinder 11 in each cylinder cycle is smaller than a predetermined air charge amount (steps S5 to S9 in FIG. 5). Further still, included is a step where the engine controlling unit 100 closes the intake valve 21 in the second range $IVC_{2nd}$ which is set to be retarded from the intake valve closing timing with which the target air charge amount CE is maximized at the given engine speed $N_{ENG}$ in each cylinder cycle and separated from the first range, when the target air charge amount CE is equal to or more than a predetermined air charge amount (steps S20 to S23 in FIG. 6, and step S9 in FIG. 5).

Therefore, in this embodiment, the intake valve 21 is closed in the first range $IVC_{1st}$ (before the bottom dead center, for example) when the target air charge amount CE is smaller than a predetermined air charge amount, whereas the intake valve 21 is closed in the second range $IVC_{2nd}$ (after the bottom dead center, for example) when the target air charge amount CE is equal to or more than a predetermined air charge amount. Thus, as in the examples describe above, for example, in a case of applying the intake valve driving mechanism 30 in which the intake valve closing timing is retarded as the target air charge amount CE increases while the change of the intake valve opening timing is kept relatively small, the engine 1 is operated with a small valve opening amount suitable for the required air charge amount CE by the earlier closing operation in the operating range where the target air charge amount CE is relatively small, reducing mechanical loss due to excessive valve operation, and the required air charge amount CE is fully secured and abnormal combustion such as pre-ignition can be inhibited by the later closing operation in the operating range in which a target air charge amount CE is high. Further, the engine output increases in an engine high-load condition in which the target air charge amount CE is high with a high possibility of increasing the engine speed $N_{ENG}$ thereafter. Under the influence of the intake air inertia, the higher the engine speed, the more retarded the intake valve closing timing is for obtaining a constant air charge amount CE. Accordingly, by setting the valve closing timing of the intake valve 21 in the second range $IVC_{2nd}$ in advance when the engine speed is in a low operation range, a frequency of the intake valve closing timing being within the intermediate range $IVC_{IM}$ located between the first range $IVC_{1st}$ and the second range $IVC_{2nd}$ during the engine speed increasing under a high-load condition is minimized. Minimizing the frequency of the intake valve closing being within the intermediate range $IVC_{IM}$ minimizes the extent of decreasing the intake passage pressure to minimize pumping loss. Therefore, the expansion ratio is increased while preventing an occurrence of problems accompanied by a high compression ratio to allow engine operation efficiency to be improved.

In this embodiment, the first range $IVC_{1st}$ is before the intake bottom dead center of each cylinder cycle, and the second range $IVC_{2nd}$ is after the intake bottom dead center of each cylinder cycle in a low speed operating range of the engine 1. Therefore, in this embodiment, particularly in the low speed operating range having the pre-ignition problem, the expansion ratio is increased in a setting range where abnormal combustion such as pre-ignition is reliably inhibited to allow engine operation efficiency to be improved.

Further, in this embodiment, included is a step where the pressure of air blown into the combustion chamber 17 is decreased as the target air charge amount CE increases in response to when the target air charge amount CE is equal to, or more than, the predetermined air charge amount (controls of FIGS. 11A, 12A, 13A and 14A). Therefore, in this embodiment, the pressure of air blown into the combustion chamber 17 (that is, the intake passage pressure), is set relatively low immediately after the target air charge amount CE increases to a predetermined air charge amount or more. Thus, the intake valve closing timing on this occasion is set on a relatively advanced side in the second range $IVC_{2nd}$, that is, on a side close to the first range $IVC_{1st}$. Accordingly, a variation of the intake valve closing timing when the target air charge amount CE increases to a predetermined air charge amount or more can be minimized, and as a result, the switching operation from the earlier closing operation to the later closing operation is simplified to a necessary and minimum extent, thereby allowing the driving operation switching to be completed in a short time.

Further, in this embodiment, included is a step where the pressure blown into the combustion chamber 17 is decreased as the target air charge amount CE increasing when the target air charge amount CE is smaller than a predetermined air charge amount (control of FIG. 9). Therefore, in this embodiment, the intake passage pressure is decreased immediately before the target air charge amount CE increases to a predetermined air charge amount or more. Thus, in the process of switching the earlier closing operation to the later closing operation, even if the intake valve 21 closes in the intermediate range $IVC_{IM}$ positioned between the first range $IVC_{1st}$ and the second range $IVC_{2nd}$, the intake passage pressure is decreased at that time, thereby enabling the prevention of abnormal combustion such as pre-ignition.

Still further, in this embodiment, included is a step where as the engine speed $N_{ENG}$ increases, the closing timing of the intake valve 21 of each cylinder cycle is retarded (controls of FIGS. 8, 11A and 11B). Therefore, in this embodiment, an adequate air flow amount can be maintained in accordance with the intake air inertia increasing as the engine speed $N_{ENG}$ increases as shown in FIGS. 14A and 14B, thereby to allow a preferable air charge amount CE to be kept over a broad operating range.

Further, in this embodiment, when the target air charge amount CE is equal to, or more than, a predetermined air charge amount (that is, in the later closing mode $M_{LIVC}$ where the intake valve 21 is subjected to a closing-valve control in the second range $IVC_{2nd}$), as the target air charge amount CE increases, the closing timing of the intake valve 21 of each cylinder cycle is advanced (controls of FIGS. 11B, 12B, 13B and 14B). Therefore, in this embodiment, the target air charge amount CE can be obtained over a broad operating range without pumping loss.

Further, this embodiment provides an internal combustion engine system including: the engine 1 having the cylinder 11 accommodating the piston 15 which reciprocates therein and defining the combustion chamber 17, the intake passage (such as the intake manifold 55 and the intake port 18) through which air is inducted into the combustion chamber 17, and the intake valve 21 capable of blocking the intake port from the combustion chamber 17; the intake valve driving mechanism 30 as the variable valve operating system changes the intake valve 21 periodically; the throttle valve 57 which is provided to the intake passage and can narrow the airflow flown into the cylinder 11; and the engine controlling unit 100 as the controller for controlling the intake valve driving mechanism 30 and the throttle valve 57.

The engine controlling unit 100 according to the embodiment achieves a step where when the intake valve 21 closes on the advanced side from the intake valve closing timing IVC with which the air charge amount is maximized at the given engine speed $N_{ENG}$ in each cylinder cycle In such an example, the intake valve closing timing IVC is retarded as the target amount CE of air to be inducted into each cylinder 11 increases (control of FIG. 8). The embodiment further achieves a step where the pressure in the intake passage is decreased as the intake valve closing timing IVC is retarded (control of FIG. 9).

Therefore, in this embodiment, the target air charge amount CE can be obtained with the intake passage pressure being maintained high until the cylinder air charge amount reaches a point which is too high, and thus having a possibility of abnormal combustion occurrence. Thus, pumping loss is reduced to improve the engine operation efficiency when the engine operation condition is a low-load condition where the engine stays for relative long periods. In addition, when the engine condition changes from the operating range $R_{EIVC}$ (where the earlier closing operation is performed to the retarded operating range such as the operating range $R_{LIVC}$ where the later closing operation is performed due to the rise of the engine speed $N_{ENG}$ by the increase of the engine output), the intake valve closing timing IVC may be retarded to come close to a timing with which the cylinder air charge amount is maximized in advance. As a result, the frequency of the closing operation of the intake valve 21 in the operating range $R_{TR}$ having a possibility of abnormal combustion can be minimized, and an appropriate cylinder air charge amount is achieved while decreasing a possibility of abnormal combustion associated with a high compression ratio even at a transient change.

Further, in this embodiment, included is a step when the intake valve 21 closes on the retarded side from the intake valve closing timing IVC with which the cylinder air charge amount is maximized at the engine speed $N_{ENG}$ in each cylinder cycle, the throttle valve opening TVO is controlled to increase the decreased pressure in the intake passage as the intake valve closing timing IVC is retarded. Therefore, in this embodiment, when the intake valve closing timing IVC is retarded until the possibility of abnormal combustion occurrence decreases, the intake passage pressure is increased to reduce the intake pumping loss in the high air charge amount. In addition, when the closing operation of the intake valve 21 is changed from the operating range $R_{EIVC}$ where the earlier closing operation is performed to the operating range $R_{LIVC}$ where the later closing operation is performed, the intake valve closing timing IVC may come close to a timing with which the cylinder air charge amount is maximized. As a result, the frequency of the closing operation of the intake valve 21 in the operating range $R_{TR}$ having a possibility of abnormal combustion may be minimized, thereby preventing the problem accompanied by a high compression ratio from occurring and increasing the expansion ratio to improve engine operation efficiency.

In other words, this embodiment also provides a control method including a step where the intake valve 21 closes later in each cylinder cycle as the target amount CE of air to be inducted into the cylinder 11 during each cylinder cycle increases. Further the control method includes a step where the pressure in the intake passage is decreased as the valve closing timing is retarded when the intake valve closing timing IVC is before a first predetermined timing in each cylinder cycle, and the pressure in the intake passage is increased as the valve closing timing is retarded when the intake valve closing timing IVC is later than the first predetermined timing in each cylinder cycle. The target air charge amount CE can be obtained with the intake passage pressure being maintained high until the cylinder air charge amount reaches to a point which is too high having a possibility of abnormal combustion occurrence by selecting the first predetermined timing; for example, the intake valve closing timing IVC with which the cylinder air charge amount is maximized at the given engine speed $N_{ENG}$. Thus, pumping loss is reduced to improve engine operation efficiency when an engine operation condition is a low-load condition where an engine stays for relative long periods. On the other hand, in the high-load range having a possibility of abnormal combustion occurrence being reduced with the engine speed increased, the second range $IVC_{2nd}$ is employed as the intake valve closing timing which is retarded and corresponds to an acceptable air amount at a time after the engine speed increases and when the possibility of abnormal combustion occurrence is decreased by decrease of the intake valve pressure. Thereby, in the operating range $R_{TR}$ having abnormal combustion occurrence, pumping loss is reduced in a broad operating range while preventing the occurrence of the pre-ignition and the like to improve engine operation efficiency. Further, the intake valve closing timing IVC can come close to a timing with which the cylinder air charge amount is maximized when changing from the operating range $R_{EIVC}$ where the earlier closing operation is performed to the operating range $R_{LIVC}$ where the later closing operation is performed, resulting in that a frequency of the intake valve 21 performing the closing operation can be minimized in the operating range $R_{TR}$ having a possibility of abnormal combustion, thereby preventing a problem accompanied by a high compression ratio from occurring and increasing the expansion ratio to improve engine operation efficiency.

Further, in the embodiment provides a method including a step where the intake valve 21 closes later in the cylinder cycle as the target amount CE of air to be inducted into the cylinder 11 in each cylinder cycle in a case of closing on the advanced side from the intake valve closing timing IVC with which the cylinder air charge amount is maximized at the engine speed $N_{ENG}$, and a step where the opening the throttle valve 57 is decreased as the intake valve closing timing IVC is retarded. Therefore, in this embodiment, the target air charge amount CE can be obtained with the opening of the throttle valve 57 being kept high and the intake passage pressure being maintained high until the cylinder air charge amount reaches to a point which is too high having a possibility of abnormal combustion occurrence. Thus, pumping loss is reduced to improve engine operation efficiency when an engine operation condition is a low-load condition where an engine stays for relative long periods. In addition, also when the engine condition changes from the operating range $R_{EIVC}$ where the earlier closing operation is performed to the operating range which is for obtaining a desired cylinder air charge amount and in which the intake valve closing timing IVC is retarded such as the operating range $R_{LIVC}$ where the later closing operation is performed due to the rise of the engine speed $N_{ENG}$ by increasing of the engine output, the intake valve closing timing can be retarded to come close to the timing IVC with which the cylinder air charge amount is maximized in advance. As a result, the expansion ratio is increased to improve the engine operation efficiency while suppressing the possibility of abnormal combustion occurrence accompanied by a high compression ratio. In addition, as a method for controlling the intake passage pressure, adjusting the opening of the throttle valve 57 is employed, allowing easy control of a desired combustion property with an existing configuration.

Particularly in this embodiment, there is further included a step where the decreased throttle valve opening is increased as the intake valve closing timing IVC is retarded. Therefore, in this embodiment, when the intake valve closing timing IVC is retarded until a possibility of abnormal combustion occurrence decreases, the opening of the throttle valve 57 is increased to increase the intake passage pressure, and thereby the intake pump loss can be reduced in the operating range of the high cylinder air charge amount.

Particularly, in this embodiment, provided downstream of the throttle valve 57 is the EGR pipe 62 as an exhaust gas recirculation passage which recirculates the exhaust gas from the exhaust passage of the engine 1 to the intake passage, and included is a step where the amount of the EGR gas (EGR valve opening) passing the EGR pipe 62 is increased as the opening of the throttle valve 57 decreases. Therefore, in this embodiment, as the operating condition comes close to the operating range $R_{TR}$ where abnormal combustion is concerned, pre-ignition and the like are restricted by the outer EGR gas recycling from the EGR pipe 62 that has a lower temperature than the inner EGR gas (a gas remaining in the cylinder 11). Thus, engine operating efficiency is improved while avoiding abnormal combustion and decreasing pump loss over a broad operation range.

Additionally, the geometric compression ratio of the engine 1 is equal to 13 or more in this embodiment. Therefore, in this embodiment, the intake valve closing timing IVC is set before or after the intake valve closing timing IVC due to the high geometric compression ratio to allow the increase of the expansion ratio and further improvement of engine operation efficiency. In addition, also when the engine condition changes from the operating range $R_{EIVC}$ where the earlier closing operation is performed to the operating range which is for obtaining a desired cylinder air charge amount and in which the intake valve closing timing IVC is retarded such as the operating range $R_{LIVC}$ where the later closing operation is performed due to a rise of the engine speed $N_{ENG}$ by the increasing of the engine output, the intake valve closing timing may be retarded to come close to the timing IVC with which the cylinder air charge amount is maximized in advance. As a result, the expansion ratio is increased to improve engine operation efficiency while suppressing the possibility of abnormal combustion occurrence accompanied by a high compression ratio.

The above described embodiment illustrates only a preferable example of the invention, and the invention is not limited to the above embodiment. It goes without saying that various modifications may be made within a scope of claims of the invention.

The invention claimed is:

1. A method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising:
    closing said intake valve at a timing in a first range, which is before a maximum charge closing timing with which an amount of air inducted into said cylinder from said air intake passage would be maximized at a given engine speed, during a cylinder cycle when a desired amount of air to be inducted into said cylinder is less than or equal to a predetermined air amount at the given engine speed; and
    closing said intake valve at a timing in a second range, which is after said maximum charge closing timing and separated from said first range during a cylinder cycle, when a desired amount of air to be inducted into said cylinder is greater than said predetermined air amount at the given engine speed.

2. The method of claim 1, wherein said first range is before the intake bottom dead center during the cylinder cycle and said second range is after the intake bottom dead center during the cylinder cycle.

3. The method of claim 1, further comprising decreasing a pressure of air inducted into said cylinder as a desired amount of air to be inducted into said cylinder increases, when said desired air amount is less than or equal to said predetermined air amount at the given engine speed.

4. The method of claim 1, further comprising closing said intake valve later during a cylinder cycle as an engine speed increases.

5. The method of claim 1, further comprising increasing a lift of said intake valve as a desired amount of air to be inducted into said cylinder increases, and when said desired air amount is less than or equal to said predetermined air amount at the given engine speed.

6. The method of claim 1, further comprising changing the timing of closing said intake valve between said first range and said second range and temporarily decreasing a pressure of air inducted into said cylinder when a desired amount of air to be inducted into said cylinder changes beyond said predetermined air amount at the given engine speed.

7. The method of claim 1, further comprising closing said intake valve earlier during a cylinder cycle as a desired amount of air to be inducted into said cylinder increases, when said desired air amount is greater than said predetermined air amount at the given engine speed.

8. The method of claim 7, further comprising substantially maintaining a pressure of air inducted into said cylinder when said desired air amount is greater than said predetermined air amount at the given engine speed.

9. A method of controlling an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage, the method comprising:
    closing said intake valve later as a desired amount of air to be inducted into said cylinder increases, before a maximum charge closing timing with which an amount of air inducted into said cylinder from said air intake passage is maximized at a given engine speed, during a cylinder cycle; and
    decreasing a pressure of air inducted into said cylinder as said timing of closing said intake valve is retarded, before said maximum charge closing timing at the given engine speed, during the cylinder cycle.

10. The method of claim 9, further comprising:
    closing said intake valve at a timing which is later during a cylinder cycle as a desired amount of air to be inducted into said cylinder increases, and which is before said maximum charge closing timing at the given engine speed during the cylinder cycle; and
    increasing a pressure of air inducted into said cylinder as said timing of closing said intake valve is retarded beyond said maximum charge closing timing at the given engine speed during the cylinder cycle.

11. The method of claim 9, wherein a throttle valve is provided in said air intake passage and is configured to adjust air flow inducted to said cylinder, and
    wherein said decreasing the pressure of air inducted into said cylinder is made by closing said throttle valve.

12. The method of claim 11, further comprising opening said throttle valve after said closing said throttle valve.

13. The method of claim 11, wherein an exhaust gas recirculation passage is provided which introduces exhaust gas from an exhaust gas passage of said internal combustion engine to said air intake passage downstream of said throttle valve, and further comprising increasing flow of said exhaust gas recirculation passage as said throttle valve closes.

14. A system comprising:
    an internal combustion engine having a cylinder accommodating a piston which reciprocates therein, and defining a combustion chamber, an air intake passage through which air is inducted into said cylinder, and an intake valve capable of shutting off air flowing into said cylinder from said air intake passage;
    an intake valve driving mechanism which is configured to cyclically open and close said intake valve by converting a rotational motion of a crankshaft of said internal combustion engine into a reciprocating motion of said intake valve; and
    a controller configured to control said intake valve driving mechanism to:
        close said intake valve at a timing in a first range, which is before a maximum charge closing timing with which an amount of air inducted into said cylinder from said air intake passage is maximized at a given engine speed, during a cylinder cycle when a desired amount of air to be inducted into said cylinder is less than or equal to a first predetermined air amount at the given engine speed; and
        close said intake valve at a timing in a second range which is after said maximum charge closing timing and separated from said first range, during a cylinder cycle when a desired amount of air to be inducted into said cylinder is greater than said predetermined air amount at the given engine speed.

15. The system of claim 14, wherein said internal combustion engine has a geometric compression ratio of 13:1 or greater.

16. The system of claim 14, wherein said intake valve driving mechanism includes a valve lift changing mechanism configured to change a valve lift during a cylinder cycle, and wherein said controller is configured to control said valve lift mechanism to increase a lift of said intake valve as a desired amount of air to be inducted into said cylinder increases, when said desired air amount is less than or equal to said predetermined air amount at the given engine speed.

17. The system of claim 14, wherein a throttle valve is provided in said air intake passage and is configured to adjust air flow inducted to said cylinder, and wherein said controller is further configured to control said intake valve driving mechanism to change timings of closing said intake valve between said first range and said second range and is further configured to adjust said throttle valve to temporarily close said air intake passage when a desired amount of air to be inducted into said cylinder changes beyond said predetermined air amount at the given engine speed.

18. A system comprising:
   an internal combustion engine having a cylinder accommodating a piston which reciprocates therein, and defining a combustion chamber, an air intake passage through which air is inducted into said cylinder, a throttle valve arranged in said air intake passage and configured to adjust air flow inducted to said cylinder, and an intake valve capable of shutting off air flowing into said cylinder from said air intake passage;
   an intake valve driving mechanism which is configured to cyclically open and close said intake valve by converting a rotational motion of a crankshaft of said internal combustion engine into a reciprocating motion of said intake valve; and
   a controller configured to control:
   said intake valve driving mechanism to close said intake valve later as a desired amount of air to be inducted into said cylinder increases, before a maximum charge closing timing with which an amount of air inducted into said cylinder from said air intake passage would be maximized at a given engine speed, during a cylinder cycle; and
   said throttle valve to close said air intake passage as said timing of closing said intake valve is retarded, before said maximum charge closing timing at the given engine speed, during the cylinder cycle.

19. The system of claim 18, wherein said internal combustion engine has a geometric compression ratio of 13:1 or greater.

20. The system of claim 18, wherein said controller is further configured to control said throttle valve to open as a timing of closing said intake valve is retarded beyond said maximum charge closing timing at the given engine speed during the cylinder cycle.

* * * * *